US012753300B2

(12) United States Patent
Park et al.

(10) Patent No.: US 12,753,300 B2
(45) **Date of Patent: *Oct. 6, 2026**

(54) THERMOPLASTIC RESIN COMPOSITION

(71) Applicant: LG Chem, Ltd., Seoul (KR)

(72) Inventors: Ji Hyun Park, Daejeon (KR); Seul Ki Im, Daejeon (KR); Hyun Mo Lee, Daejeon (KR); Yun Kon Kim, Daejeon (KR); Seung Jung Yu, Daejeon (KR); Seok Pil Sa, Daejeon (KR); Ki Soo Lee, Daejeon (KR); Eun Ji Shin, Daejeon (KR)

(73) Assignee: LG Chem, Ltd., Seoul (KR)

( * ) Notice: Subject to any disclaimer, the term of this patent is extended or adjusted under 35 U.S.C. 154(b) by 808 days.

This patent is subject to a terminal disclaimer.

(21) Appl. No.: 18/017,021

(22) PCT Filed: Jul. 30, 2021

(86) PCT No.: PCT/KR2021/009957

§ 371 (c)(1),
(2) Date: Jan. 19, 2023

(87) PCT Pub. No.: WO2022/025696

PCT Pub. Date: Feb. 3, 2022

(65) Prior Publication Data

US 2023/0287207 A1 Sep. 14, 2023

(30) Foreign Application Priority Data

Jul. 30, 2020 (KR) ........................ 10-2020-0095282
Jul. 29, 2021 (KR) ........................ 10-2021-0100046

(51) Int. Cl.
*C08L 53/00* (2006.01)
*C08F 2/38* (2006.01)
(Continued)

(52) U.S. Cl.
CPC ................ *C08L 53/00* (2013.01); *C08F 2/38* (2013.01); *C08F 4/64144* (2013.01);
(Continued)

(58) Field of Classification Search
CPC ........ C08L 53/00; C08L 23/12; C08L 23/142; C08F 2/38; C08F 4/64144; C08F 295/00
See application file for complete search history.

(56) References Cited

U.S. PATENT DOCUMENTS 12,122,905 B2 10/2024 Lee et al.
2005/0119380 A1 * 6/2005 Iwashita ................ C08L 23/16 524/543
(Continued)

FOREIGN PATENT DOCUMENTS

CN 102341453 A 2/2012
CN 108250653 A 7/2018
(Continued)

OTHER PUBLICATIONS

Polystyrene Chain Growth from Di-End-Functional Polyolefins for Polystyrene-Polyolefin-Polystyrene Block Copolymers, Kim et al. Polymers 2017, 9(10), pp. 481 (Year: 2017).*
(Continued)

*Primary Examiner* — Heidi R Kelley
*Assistant Examiner* — Surbhi M Du
(74) *Attorney, Agent, or Firm* — Lerner David LLP

(57) ABSTRACT

The present invention relates to a thermoplastic resin composition including a polyolefin-polystyrene-based multi-block copolymer having a structure in which a polystyrene chain is attached to polyolefin chains, and the thermoplastic resin composition according to the present invention has significantly improved low-temperature and room tempera-
(Continued)

ture impact strength properties as well as high fluidity properties, and thus, may exhibit excellent molding processability.

15 Claims, 3 Drawing Sheets

(51) Int. Cl.

| | |
|---|---|
| ***C08F 4/64*** | (2006.01) |
| ***C08F 4/659*** | (2006.01) |
| ***C08F 295/00*** | (2006.01) |
| ***C08L 23/12*** | (2006.01) |
| ***C08L 23/14*** | (2006.01) |

(52) U.S. Cl.

CPC ............ *C08F 295/00* (2013.01); *C08L 23/12* (2013.01); *C08L 23/142* (2013.01); *C08F 4/65908* (2013.01); *C08F 4/65912* (2013.01)

(56) References Cited

U.S. PATENT DOCUMENTS

| | | | |
|---|---|---|---|
| 2005/0119392 | A1 | 6/2005 | Makagawa et al. |
| 2006/0246804 | A1 | 11/2006 | Thomas et al. |
| 2008/0249219 | A1 | 10/2008 | Uehara et al. |
| 2009/0137708 | A1 | 5/2009 | Kim et al. |
| 2009/0258973 | A1 | 10/2009 | Mizukami et al. |
| 2009/0324863 | A1 | 12/2009 | Mizukami et al. |
| 2010/0003882 | A1 | 1/2010 | Sumi et al. |
| 2011/0319548 | A1 | 12/2011 | Hoya et al. |
| 2013/0225020 | A1 | 8/2013 | Flood et al. |
| 2013/0299731 | A1 | 11/2013 | Wright et al. |
| 2014/0364532 | A1 | 12/2014 | Dubois et al. |
| 2014/0364555 | A1 | 12/2014 | Wiegand et al. |
| 2014/0371377 | A1 | 12/2014 | Salazar |
| 2016/0102164 | A1 | 4/2016 | Wiegand et al. |
| 2017/0292015 | A1 | 10/2017 | Lim et al. |
| 2018/0002474 | A1 | 1/2018 | Zhou et al. |
| 2018/0022852 | A1 | 1/2018 | Lee et al. |
| 2018/0186997 | A1 | 7/2018 | Youm et al. |
| 2019/0292361 | A1 | 9/2019 | Flood et al. |
| 2020/0031978 | A1 | 1/2020 | Lee et al. |
| 2020/0325324 | A1 | 10/2020 | Flood et al. |
| 2021/0002303 | A1 | 1/2021 | Sa et al. |
| 2021/0002473 | A1 | 1/2021 | Lee et al. |
| 2021/0017377 | A1 | 1/2021 | Shin et al. |
| 2021/0108066 | A1 | 4/2021 | Hong et al. |
| 2022/0177634 | A1* | 6/2022 | Im .......................... C08F 212/08 |
| 2023/0116142 | A1* | 4/2023 | Im ........................ C08F 297/086 526/170 |

FOREIGN PATENT DOCUMENTS

| | | | |
|---|---|---|---|
| CN | 110475795 | A | 11/2019 |
| JP | 2000143887 | A | 5/2000 |
| JP | 2000344840 | A | 12/2000 |
| JP | 2003226791 | A | 8/2003 |
| JP | 2019521224 | A | 7/2019 |
| KR | 20060133579 | A | 12/2006 |
| KR | 20060135846 | A | 12/2006 |
| KR | 20070097130 | A | 10/2007 |
| KR | 20080004517 | A | 1/2008 |
| KR | 20090098994 | A | 9/2009 |
| KR | 20150012237 | A | 2/2015 |
| KR | 101657925 | B1 | 9/2016 |
| KR | 20160139567 | A | 12/2016 |
| KR | 20160149146 | A | 12/2016 |
| KR | 20170076278 | A | 7/2017 |
| KR | 20170120885 | A | 11/2017 |
| KR | 101829382 | B1 | 2/2018 |
| KR | 101848781 | B1 | 4/2018 |
| KR | 20190063818 | A | 6/2019 |
| KR | 20190064279 | A | 6/2019 |
| KR | 101997324 | B1 | 7/2019 |
| KR | 20190114716 | A | 10/2019 |
| KR | 102071588 | B1 | 1/2020 |
| KR | 20200035667 | A | 4/2020 |
| TW | 201811911 | A | 4/2018 |
| WO | 2019190288 | A1 | 10/2019 |

OTHER PUBLICATIONS

Durmus, Ali, et al., "Investigation of rheological behaviors of polyolefin blend type thermoplastic elastomers for quantifying microstructure-property relationships", Korea-Australia Rheology Journal, May 2019, 31(2), pp. 97-110.

International Search Report for PCT/KR2021/009959 mailed Nov. 23, 2021. 5 pgs.

Jong. Y. et al., "Synthesis of Polyolefin-block-polystyrene Through Sequential Coordination and Anionic Polymerizations" Journal of Polymer Science, Polymer Chemistry, Jun. 2016, pp. 3110-3118, vol. 54, Issue 19.

International Search Report for PCT/KR2021/009957 mailed Nov. 22, 2021. 4 pgs.

* cited by examiner

[FIG. 1]
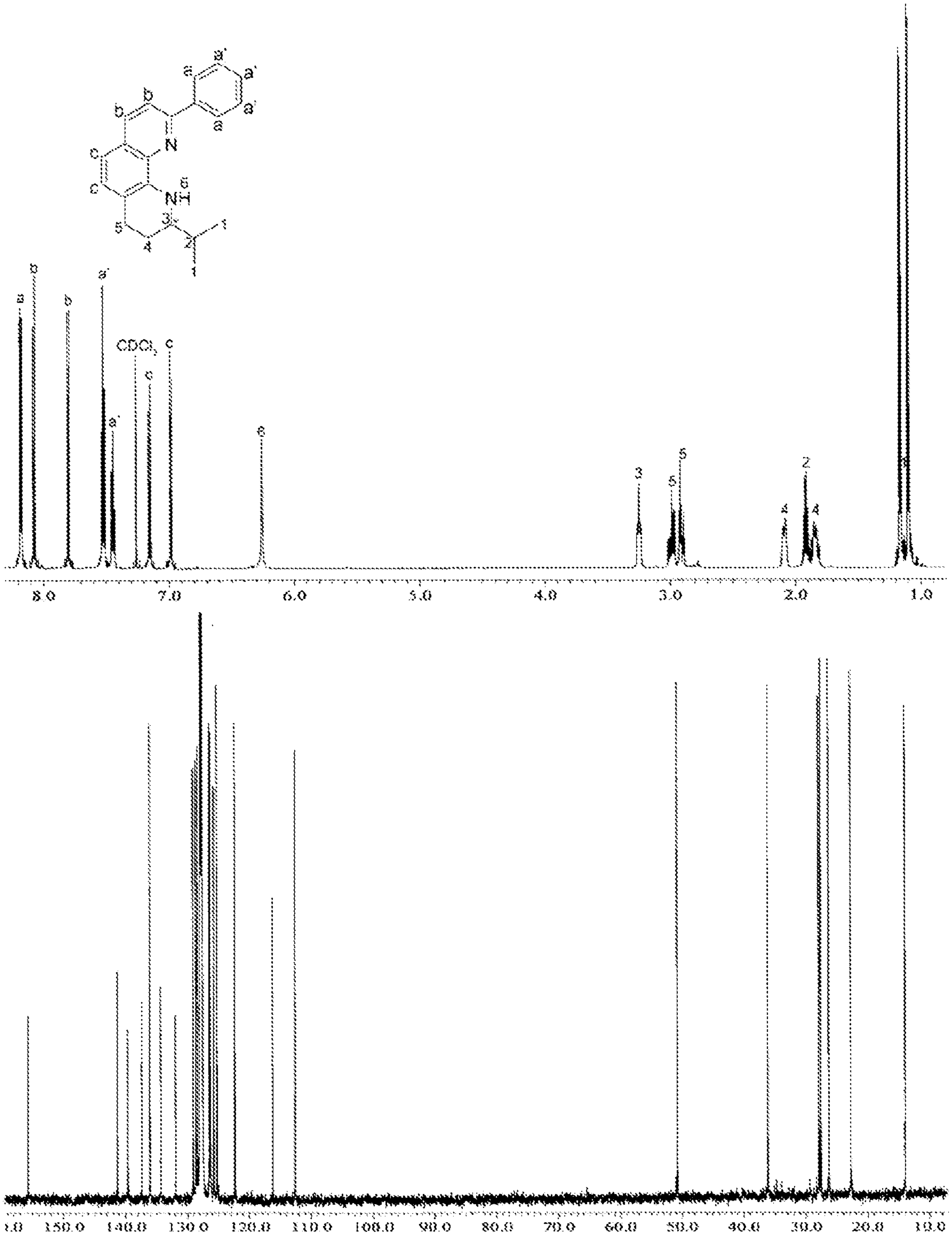

[FIG. 2]
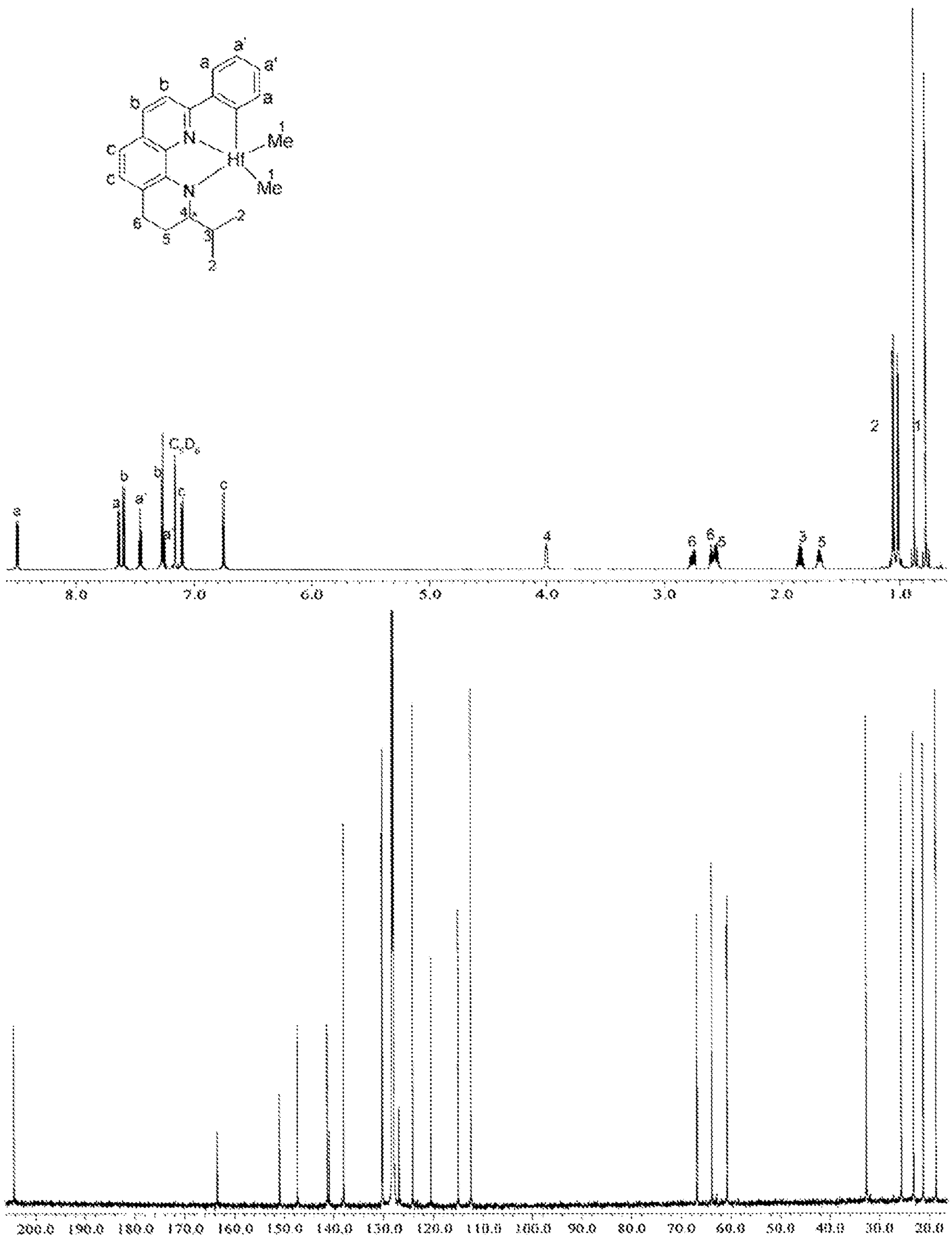

[FIG. 3]
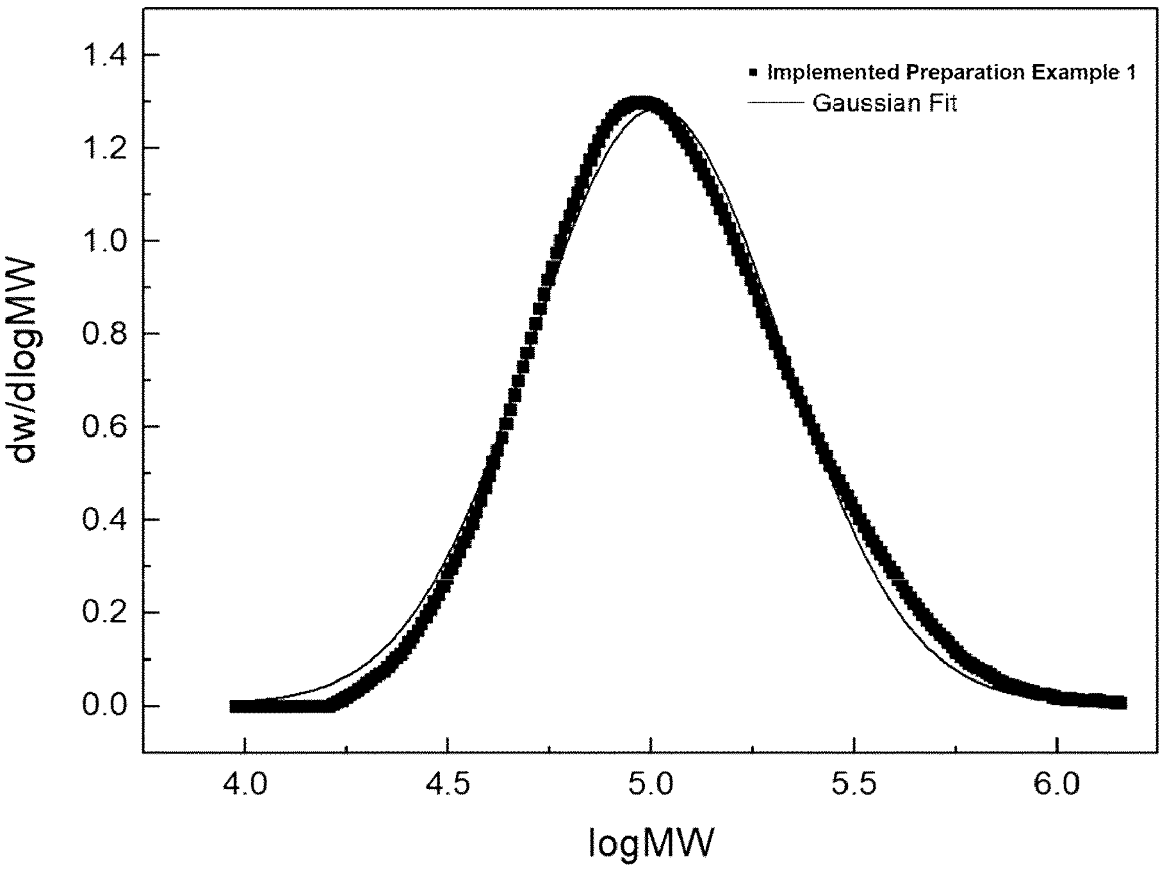

THERMOPLASTIC RESIN COMPOSITION

CROSS-REFERENCE TO RELATED APPLICATIONS

The present application is a national stage entry under U.S.C. § 371 of International Application No. PCT/KR2021/009957 filed on Jul. 30, 2021, which claims priority from Korean Patent Application Nos. 10-2020-0095282 filed on Jul. 30, 2020, and 10-2021-0100046 filed on Jul. 29, 2021, all the disclosures of which are incorporated herein by reference.

TECHNICAL FIELD

The present invention relates to a thermoplastic resin composition including a polyolefin-polystyrene-based multi-block copolymer having a structure in which a polystyrene chain is attached to polyolefin chains.

BACKGROUND ART

Polypropylene has excellent rigidity and molding processability, and thus, is widely used as a material for automotive interior and exterior parts, but has weak impact strength, which is disadvantageous. Therefore, in general, as a composition for automotive interior and exterior parts, a polypropylene-based resin composition including polypropylene (PP) as a main component and an impact resistant reinforcing material and an inorganic filler has been used.

Typically, as a material for automotive interior and exterior materials, particularly for a bumper cover, ethylene propylene rubber (EPR) or ethylene propylene diene rubber (EPDM) has been mainly used as an impact resistant reinforcing material in most polypropylene-based resin compositions. Since an ethylene-α-olefin copolymer synthesized by a metallocene catalyst was introduced, the ethylene-α-olefin copolymer has been used as an impact resistant reinforcing material. A polypropylene-based resin composition using an ethylene-α-olefin copolymer has balanced physical properties of impact strength, modulus of elasticity, flexural rigidity, etc., has good moldability, and is also cheap However, the polypropylene-based resin composition using an ethylene-α-olefin copolymer has limitations in securing impact resistance depending on various use environments.

In addition, styrene-ethylene-butylene-styrene (SEBS), which is a styrene-based thermoplastic elastic body, has also been used in a polypropylene-based resin composition, but there are disadvantages in that SEBS is expensive and significantly degrades the fluidity of polypropylene.

Therefore, there is still a demand for the development of a thermoplastic resin composition which maintains high fluidity properties of polypropylene and also has excellent impact resistance.

PRIOR ART DOCUMENT

Patent Document (Patent Document 1) Korean Patent Laid-Open Publication No. 10-1657925.

DISCLOSURE OF THE INVENTION

Technical Problem

An aspect of the present invention provides a thermoplastic resin composition having high fluidity properties but capable of exhibiting excellent mechanical strength as well as significantly improved impact strength properties.

Technical Solution

According to an aspect of the present invention, there is provided a thermoplastic resin composition including (1) polypropylene, and (2) a polyolefin-polystyrene-based multi-block copolymer satisfying the following conditions (a) to (c) measured from Gel Permeation Chromatography (GPC) and the following condition (d) in $^{13}C$ NMR (500 MHz, tetrachloroethane-d2, standard material TMS) spectrum.

(a) a weight average molecular weight is 50,000 to 300,000 g/mol, (b) a molecular weight distribution is 1.5 to 3.0, (c) for gel permeation chromatography measurement results, a Gaussian function modeled from a graph having log Mw as an x-axis and dw/d log Mw as a y-axis is represented by Equation 1 below, wherein in Equation 1 below, each constant value satisfies $-0.05<A<0.06$, $4.6<B<5.5$, $0.9<C<1.1$, and $0.5<D<0.9$, and (d) a polyolefin block included in the polyolefin-polystyrene-based multi-block copolymer includes one or more branching points, wherein a carbon atom of the branching point exhibits a peak of 36 to 40 ppm, and a terminal carbon atom of a branched chain branched from the branching point exhibits a peak of 13 to 15 ppm.

$$\frac{dw}{d\log Mw} = A + \frac{C\exp\left(\frac{-4\ln(2)(\log Mw - B)^2}{D^2}\right)}{D\sqrt{\frac{\pi}{4\ln(2)}}} \quad \text{[Equation 1]}$$

(In Equation 1 above, Mw represents the weight average molecular weight of a polyolefin-polystyrene-based multi-block copolymer.)

Advantageous Effects

A thermoplastic resin composition according to the present invention has significantly improved impact strength properties as well as high fluidity properties, and thus, may exhibit excellent molding processability.

BRIEF DESCRIPTION OF THE DRAWINGS

FIG. 1 shows $^{1}H$ NMR and $^{13}C$ NMR spectra of a ligand compound used in the preparation of a polyolefin-polystyrene-based multi-block copolymer included in a thermoplastic resin composition according to an embodiment of the present invention;

FIG. 2 shows $^{1}H$ NMR and $^{13}C$ NMR spectra of a transition metal compound used in the preparation of a polyolefin-polystyrene-based multi-block copolymer included in a thermoplastic resin composition according to an embodiment of the present invention; and FIG. 3 is a graph showing a polyolefin-polystyrene-based multi-block copolymer included in a thermoplastic resin composition according to an embodiment of the present invention by Equation 1.

MODE FOR CARRYING OUT THE INVENTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The term "composition" as used herein includes not only a reaction product and a decomposition product formed from materials of a corresponding composition, but also a mixture of materials including the corresponding composition.

The term "polymer" as used herein refers to a polymer compound prepared by polymerizing monomers, whether of the same or different kinds. Thus, the generic term "polymer" covers the term "homopolymer" which is commonly used to refer to a polymer prepared from only one kind of monomer and the term "interpolymer" as defined below.

The term "interpolymer" as used herein refers to a polymer prepared by polymerizing at least two different kinds of monomers. Thus, the generic term "interpolymer" covers the term "copolymer" which is commonly used to refer to a polymer prepared from two different kinds of monomers and the term "polymer" prepared from two or more kinds of different monomers.

Hereinafter, the present invention will be described in detail.

A thermoplastic resin composition according to the present invention includes (1) polypropylene, and (2) a polyolefin-polystyrene-based multi-block copolymer satisfying the following conditions (a) to (c) measured from Gel Permeation Chromatography (GPC) and the following condition (d) in $^{13}C$ NMR (500 MHz, tetrachloroethane-d2, standard material TMS) spectrum.

(a) the weight average molecular weight is 50,000 to 300,000 g/mol, (b) the molecular weight distribution is 1.5 to 3.0, (c) for gel permeation chromatography measurement results, a Gaussian function modeled from a graph having log Mw as the x-axis and dw/d log Mw as the y-axis is represented by Equation 1 below, wherein in Equation 1 below, each constant value satisfies $-0.05<A<0.06$, $4.6<B<5.5$, $0.9<C<1.1$, and $0.5<D<0.9$, and (d) a polyolefin block included in the polyolefin-polystyrene-based multi-block copolymer includes one or more branching points, wherein a carbon atom of the branching point exhibits a peak of 36 to 40 ppm, and a terminal carbon atom of a branched chain branched from the branching point exhibits a peak of 13 to 15 ppm.

$$\frac{dw}{d\log Mw} = A + \frac{C\exp\left(\frac{-4\ln(2)(\log Mw - B)^2}{D^2}\right)}{D\sqrt{\frac{\pi}{4\ln(2)}}}$$ [Equation 1]

(In Equation 1 above, Mw represents the weight average molecular weight of a polyolefin-polystyrene-based multi-block copolymer.)

Hereinafter, each constituent component will be described in detail.

(1) Polypropylene

In the thermoplastic resin composition according to an embodiment of the present invention, the polypropylene may specifically be a polypropylene homopolymer, or a copolymer of propylene and an alpha-olefin monomer, wherein the copolymer may be an alternating or random, or block copolymer.

The alpha-olefin-based monomer may specifically be an aliphatic olefin having 2 to 12 carbon atoms, or 2 to 8 carbon atoms. More specifically, examples thereof may be ethylene, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicosene, 4,4-dimethyl-1-pentene, 4,4-diethyl-1-hexene, 3,4-dimethyl-1-hexene, or the like, and any one thereof or a mixture of two or more thereof may be used.

More specifically, the polypropylene may be any one or a mixture of two or more selected from the group consisting of a polypropylene copolymer, a propylene-alpha-olefin copolymer, and a propylene-ethylene-alpha-olefin copolymer, wherein the copolymer may be a random or block copolymer.

In addition, the polypropylene may have a melt index (MI) of 0.5 g/10 min to 100 g/10 min measured at 230° C. and a 2.16 kg load. Specifically, the melt index (MI) may be 1 g/10 min to 90 g/10 min. When the melt index of polypropylene is out of the above range, there is a possibility that a problem may occur during injection molding of the thermoplastic resin composition.

Specifically, in the thermoplastic resin composition according to an embodiment of the present invention, the polypropylene may be an impact copolymer having a melt index (MI) of 0.5 g/10 min to 100 g/10 min, specifically 1 g/10 min to 90 g/10 min, measured at 230° C. and a 2.16 kg load, or more specifically, may be a polypropylene-ethylene impact copolymer. When an impact copolymer having the above physical properties is included as polypropylene in the above content range, impact strength properties may be improved, and particularly, room temperature strength properties may be improved.

The impact copolymer may be included in an amount of 10 wt % to 90 wt %, specifically 20 wt % to 80 wt %, more specifically 40 wt % to 60 wt % based on the total weight of the thermoplastic resin composition.

The impact copolymer may be prepared to satisfy the above physical property requirements using a typical polymer preparation reaction, or may be commercially obtained and used. A specific example thereof may include SEETEC™ M1600, a product of LG Chem, and the like.

In addition, in the thermoplastic resin composition according to an embodiment of the present invention, the polypropylene may specifically be one or more random propylene copolymers having a DSC melting point in the range of 120 to 160° C., and a melt flow rate (MFR) in the range of 5 g/10 min to 120 g/10 min measured under the condition of 230° C. and a 2.16 kg load according to ASTM-D 1238.

When polypropylene having the above physical properties is included in the above-described content range, the mechanical strength of the thermoplastic resin composition such as hardness may be improved.

The random propylene copolymer may be included in an amount of 10 wt % to 90 wt %, specifically 20 wt % to 80 wt %, more specifically 40 wt % to 60 wt % based on the total weight of the thermoplastic resin composition.

The random propylene copolymer may be prepared to satisfy the above physical property requirements using a typical polymer preparation reaction, or may be commercially obtained and used. A specific example thereof may include Braskem™ PP R7021-50RNA of Braskem America Inc., Formolene™ 7320A of Formosa Plastics Corporation of USA, and the like.

(2) Polyolefin-Polystyrene-Based Multi-Block Copolymer

In the thermoplastic resin composition according to the present invention, the polyolefin-polystyrene-based multi-block copolymer is characterized by satisfying the following conditions (a) to (c) measured from Gel Permeation Chromatography (GPC) and the following condition (d) in $^{13}C$ NMR (500 MHz, tetrachloroethane-d2, standard material TMS) spectrum.

(a) the weight average molecular weight is 50,000 to 300,000 g/mol, (b) the molecular weight distribution is 1.5 to 3.0, (c) for gel permeation chromatography measurement results, a Gaussian function modeled from a graph having log Mw as the x-axis and dw/d log Mw as the y-axis is represented by Equation 1 below, wherein in Equation 1 below, each constant value satisfies $-0.05<A<0.06$, $4.6<B<5.5$, $0.9<C<1.1$, and $0.5<D<0.9$, and (d) a polyolefin block included in the polyolefin-polystyrene-based multi-block copolymer includes one or more branching points, wherein a carbon atom of the branching point exhibits a peak of 36 to 40 ppm, and a terminal carbon atom of a branched chain branched from the branching point exhibits a peak of 13 to 15 ppm.

$$\frac{dw}{d\log Mw} = A + \frac{C\exp\left(\frac{-4\ln(2)(\log Mw - B)^2}{D^2}\right)}{D\sqrt{\frac{\pi}{4\ln(2)}}} \quad \text{[Equation 1]}$$

(In Equation 1 above, Mw represents the weight average molecular weight of a polyolefin-polystyrene multi-block copolymer.)

The polyolefin-polystyrene-based multi-block copolymer included in the thermoplastic resin composition of the present invention is prepared by using a specific transition metal compound having a novel structure as a catalyst as to be described below, and has a weight average molecular weight, an important factor for determining the physical properties of a copolymer, satisfying Equation 1, and thus, has a weight average molecular weight and a molecular weight distribution value of a specific distribution to implement excellent tensile properties (e.g., tensile strength, elongation, modulus, etc.).

Regarding the (a) condition, the weight average molecular weight of the polyolefin-polystyrene-based multi-block copolymer may be 50,000 to 300,000 g/mol, specifically 60,000 to 250,000 g/mol, or 70,000 to 220,000 g/mol, or 70,000 to 200,000 g/mol.

Regarding the (b) condition, the molecular weight distribution of the polyolefin-polystyrene-based multi-block copolymer may be 1.5 to 3.0, specifically 1.6 to 2.3, or 1.6 to 2.2.

The weight average molecular weight and a number average molecular weight are polystyrene conversion molecular weights analyzed by gel permeation chromatography (GPC), and the molecular weight distribution is calculated from the ratio of (weight average molecular weight)/(number average molecular weight).

As to be described later, Equation 1 of the (c) condition represents a Gaussian distribution, and B to D constants included therein are used as constant values representing the weight average molecular weight and the molecular weight distribution of a copolymer. The polyolefin-polystyrene-based multi-block copolymer included in the thermoplastic resin composition of the present invention satisfies the numerical ranges of A to D, and simultaneously satisfies the weight average molecular weight and molecular weight distribution values of the (a) and (b) conditions.

Regarding the (c) condition, for gel permeation chromatography measurement results, when Equation 1 below is derived from a Gaussian function modeled from a graph having log Mw as the x-axis and dw/d log Mw as the y-axis, each constant value included in Equation 1 satisfies $-0.05<A<0.06$, $4.6<B<5.5$, $0.9<C<1.1$, and $0.5<D<0.9$. Specifically, the A constant may be greater than −0.05, greater than −0.04, less than 0.060, or less than 0.040, the B constant may be greater than 4.6, less than 5.5, or less than 5.2, the C constant may be greater than 0.90, greater than 0.91, less than 1.1, or less than 1.09, and the D constant may be greater than 0.5, greater than 0.6, less than 0.9, or less than 0.8.

Equation 1 above represents a differential molecular weight distribution curve in which the horizontal axis is 「(log(Mw))」, which is a logarithmic value of a weight average molecular weight (Mw), obtained by measuring by gel permeation chromatography with polystyrene as a conversion standard as described above, and the vertical axis is 「dw/d log(Mw)」, which is a value obtained by differentiating a concentration fraction (w) by the logarithmic value (log (Mw)) of the weight average molecular weight, which may be seen as representing a weight fraction of a polymer having the corresponding molecular weight according to the logarithmic value of the weight average molecular weight.

That is, in the present invention, a Gaussian function modeled from a graph in which an x-axis is log Mw and a y-axis is dw/d log Mw is represented by Equation 1 below, and when values of A to D constants are calculated, it has been newly found that each thereof belongs to a specific range.

In Equation 1 above, the A to D constants are constants representing a curve represented by a Gaussian distribution, and show the height of a distribution curve, the width of a maximum peak half value, the center position indicated by a maximum peak, and the like. More specifically, the A constant included in the Gaussian distribution represents a y-intercept and the C constant represents the arithmetic meaning of a graph area. In addition, the B and D constants represent physical properties of a copolymer corresponding to a weight average molecular weight and a molecular weight distribution.

Regarding the (d) condition, a polyolefin block included in the polyolefin-polystyrene-based multi-block copolymer includes one or more branching points, wherein a carbon atom of the branching point exhibits a peak of 36 to 40 ppm, and a terminal carbon atom of a branched chain branched from the branching point exhibits a peak of 13 to 15 ppm.

Specifically, the carbon atom of the branching point may exhibit a peak of 36.0 ppm or greater, 37.0 ppm or greater, or 37.5 ppm or greater, or may be 40.0 ppm or less, 39.0 ppm or less, or 38.5 ppm or less. In addition, the terminal carbon atom of a branched chain branched from the branching point may exhibit a peak of 13.0 ppm or greater, or 13.5 ppm or greater, or may be 15.0 ppm or less, or 14.5 ppm or less.

As described above, the polyolefin-polystyrene-based multi-block copolymer included in the thermoplastic resin composition of the present invention has a long branched chain in a polyolefin block, which may be identified by a unique peak region in $^{13}C$ NMR of a terminal carbon atom of a branched chain branched from a branching point. Through the above features, the polyolefin-polystyrene-based multi-block copolymer included in the thermoplastic resin composition of the present invention exhibits excellent physical properties, such as high impact strength, compared to a typical copolymer.

The polyolefin-polystyrene-based multi-block copolymer may be one or more selected from the group consisting of a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer, and a polystyrene-poly(ethylene-co-1-octene)-polystyrene block copolymer.

In addition, the polyolefin-polystyrene-based multi-block copolymer included in the thermoplastic resin composition of the present invention satisfies the (a) to (d) conditions, and thus, may have the following tensile properties.

Specifically, the polyolefin-polystyrene-based multi-block copolymer may have a tensile strength of 10 to 100 MPa, specifically 10 to 50 MPa, more specifically 20 to 40 MPa, wherein the tensile strength represents the maximum tensile stress when pulled and broken so as to evenly apply a load to a cross-sectional area.

The polyolefin-polystyrene-based multi-block copolymer may have an elongation at break of 500 to 3,000%, 600 to 2,800%, or 800 to 2,500%, wherein the elongation at break is represented as a percentage of an increased length to an original length as deformation in the direction of tension caused by tension.

The polyolefin-polystyrene-based multi-block copolymer has a 300% modulus of 2.1 to 10.0 MPa, wherein the 300% modulus is represented by average force per unit area as tensile stress when 300% elongation is given.

Tensile properties such as tensile strength, elongation at break, 300% modulus, and the like may be measured by a standard measurement method of ASTM D412.

As described above, the polyolefin-polystyrene-based multi-block copolymer included in the thermoplastic resin composition of the present invention satisfies tensile strength, elongation at break, and 300% modulus in the above ranges, and exhibits excellent physical properties compared to a typical copolymer. In addition, by adjusting the length and content of a polyolefin block using a manufacturing method provided by the present invention, it is possible to prepare a copolymer which implements specific properties according to a desired use.

In addition, a polyolefin block of the polyolefin-polystyrene-based multi-block copolymer included in the thermoplastic resin composition of the present invention may include one or more kinds of repeating units represented by Formula a below.

[Formula a]

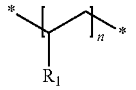

In Formula a above, $R_1$ may be hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and n may be an integer of 1 to 10,000.

Alternatively, according to an embodiment of the present invention, $R_1$ may be hydrogen, or alkyl having 3 to 20 carbon atoms.

Alternatively, according to an embodiment of the present invention, $R_1$ may be hydrogen, or alkyl having 3 to 12 carbon atoms. Specifically, $R_1$ may be hydrogen, or alkyl having 4 to 12 carbon atoms.

Alternatively, n may be an integer of 10 to 10,000. Specifically, n may be an integer of 500 to 7,000.

Meanwhile, in the formulas shown in the specification of the present invention, "*" is a terminal site of a repeating unit and represents a connection site.

When the polyolefin block includes two or more kinds of repeating units represented by Formula a above, the polyolefin block may include a repeating unit represented by Formula b below.

[Formula b]

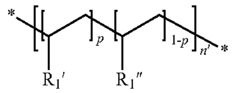

In Formula b above, $R_1'$ and $R_1''$ are each independently hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, wherein R1' and $R_1''$ are different from each other, $0<p<1$, and n' may be an integer of 1 to 10,000.

Alternatively, according to an embodiment of the present invention, R1' and $R_1''$ may each independently be hydrogen, or alkyl having 3 to 20 carbon atoms, and specifically, may each independently be hydrogen, or alkyl having 3 to 12 carbon atoms, and more specifically, may each independently be hydrogen, or alkyl having 4 to 12 carbon atoms.

Alternatively, n' may specifically be an integer of 10 to 10,000, and more specifically, may be an integer of 500 to 7,000.

According to an embodiment of the present invention, in Formula b above, any one of $R_1'$ or $R_1''$ may be hydrogen, and the other thereof may be a substituent other than hydrogen among the substituents described above.

That is, when the polyolefin block includes two or more kinds of repeating units represented by Formula a above, a structure in which $R_1$ is hydrogen and a structure in which $R_1$ is alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl other than hydrogen may be randomly connected. Specifically, a structure in which $R_1$ is hydrogen and a structure in which $R_1$ is alkyl having 3 to 20 carbon atoms other than hydrogen may be randomly connected.

Alternatively, more specifically, the polyolefin block may have a structure in which $R_1$ is hydrogen and a structure in which $R_1$ is alkyl having 3 to 12 carbon atoms randomly connected to each other. Even more specifically, the polyolefin block may have a structure in which $R_1$ is hydrogen and a structure in which $R_1$ is alkyl having 4 to 12 carbon atoms randomly connected to each other.

When the polyolefin block includes two or more kinds of repeating units represented by Formula a above, the polyolefin block may include a structure in which $R_1$ is hydrogen in Formula a above and a structure in which $R_1$ has a substituent other than hydrogen in a weight ratio of 30:90 to 70:10, specifically in a weight ratio of 40:60 to 60:40, and more specifically, in a weight ratio of 45:75 to 55:25.

When the polyolefin block includes a structure in which $R_1$ is hydrogen in Formula a above and a structure in which $R_1$ has a substituent other than hydrogen in the above range, a block copolymer prepared includes branches to an appropriate degree within a structure, and thus, has a high 300% modulus value and a high elongation at break value, thereby exhibiting excellent elasticity properties, and also exhibits a high molecular weight along with a wide molecular weight distribution, and thus, may have excellent processability.

In addition, a first polystyrene block of the polyolefin-polystyrene-based multi-block copolymer included in the thermoplastic resin composition of the present invention may include one or more kinds of repeating units represented by Formula c below.

[Formula c]

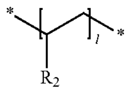

In Formula c above, $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and l is an integer of 10 to 1,000.

$R_2$ may be phenyl, or phenyl substituted or unsubstituted with halogen, alkyl having 1 to 8 carbon atoms, cycloalkyl having 3 to 12 carbon atoms, alkoxy having 1 to 8 carbon atoms, or aryl having 6 to 12 carbon atoms. Alternatively, $R_2$ may be phenyl.

l is an integer of 10 to 1,000, and may specifically be an integer of 50 to 700. When l is in the above range, the viscosity of a polyolefin-polystyrene block copolymer produced by the production method of the present invention may be at an appropriate level.

Particularly, in the polyolefin-polystyrene-based multi-block copolymer included in the thermoplastic resin composition of the present invention, the polyolefin block including a repeating unit represented by Formula a above and the first polystyrene block including a repeating unit represented by Formula c above may be bonded to each other to form a composite block represented by Formula d below.

[Formula d]

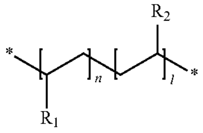

In Formula d above, $R_1$ may be hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, and $R_2$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, l is an integer of 10 to 1,000, and n is an integer of 1 to 10,000.

Alternatively, in Formula d above, $R_1$, $R_2$, l and n are the same as defined in Formula a and Formula c, respectively.

Alternatively, when the polyolefin block includes a repeating unit represented by Formula a above, a composite block formed by coupling a first polystyrene block including a repeating unit represented by Formula c above may be represented by Formula e below.

[Formula e]

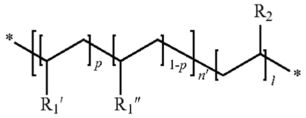

In Formula e above, $R_1'$, $R_1''$, $R_2$, p, l and n' are the same as defined in Formula a or c, respectively.

In addition, in one example of the present invention, when preparing a polyolefin-polystyrene-based multi-block copolymer, a styrene-based monomer may form a polyolefin block, and the styrene-based monomer may be simultaneously coupled to an organozinc compound and polymerized to form a separate styrene-based polymer block. In the present disclosure, the separate styrene-based polymer block is represented as a second polystyrene block. The second polystyrene block may include a repeating unit represented by Formula f below.

[Formula f]

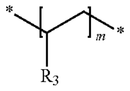

In Formula f above, $R_3$ is aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and m is an integer of 10 to 1,000.

Alternatively, according to an embodiment of the present invention, $R_3$ may be phenyl, or phenyl substituted or unsubstituted with halogen, alkyl having 1 to 8 carbon atoms, cycloalkyl having 3 to 12 carbon atoms, alkoxy having 1 to 8 carbon atoms, or aryl having 6 to 12 carbon atoms. Alternatively, $R_3$ may be phenyl.

m is an integer of 10 to 1,000, and may specifically be an integer of 50 to 700.

That is, the polyolefin-polystyrene-based multi-block copolymer included in the thermoplastic resin composition of the present invention may include a first polystyrene block including a repeating unit represented by Formula c above, and a second polystyrene block represented by Formula f above.

Accordingly, the block copolymer composition may include a triblock copolymer including a polyolefin block including one or more kinds of repeating units represented by Formula a below, a first polystyrene block including a repeating unit represented by Formula c below, and a second polystyrene block including a repeating unit represented by Formula f below.

[Formula a]

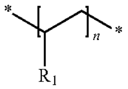

[Formula c]

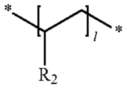

[Formula f]

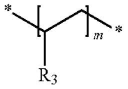

In the above formulas, $R_1$ is hydrogen, alkyl having 1 to 20 carbon atoms, alkyl having 1 to 20 carbon atoms substituted with silyl, arylalkyl having 7 to 20 carbon atoms, or arylalkyl having 7 to 20 carbon atoms substituted with silyl, $R_2$ and $R_3$ are each independently aryl having 6 to 20 carbon atoms, or aryl having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, n is an integer of 10 to 10,000, and l and m are each independently an integer of 10 to 1,000.

Alternatively, in the above formulas, $R_1$, $R_2$, $R_3$, n, l and m are the same as defined in Formulas a, c, and f, respectively.

Preparation Method of Polyolefin-Polystyrene-Based Multi-Block Copolymer

A method for preparing the polyolefin-polystyrene-based multi-block copolymer is characterized by including (S1) forming a polyolefin block by polymerizing an olefin-based monomer using an organozinc compound as a chain transfer agent in the presence of a catalyst composition including a transition metal compound represented by Formula 1 below, and (S2) forming a polystyrene block by anionic polymerization of the polyolefin block and a styrene-based monomer in the presence of an alkyl lithium compound including silicon atom and a triamine compound.

The method for preparing the polyolefin-polystyrene-based multi-block copolymer may form a polyolefin-polystyrene-based multi-block copolymer exhibiting a specific height of a tan δ peak and a half-width of the tan δ peak by forming a polyolefin chain using a transition metal compound represented by Formula 1, which is efficiently utilized in the polymerization of an olefin-based monomer, as a catalyst, and then continuously performing styrene anion polymerization, thereby forming a polyolefin-polystyrene block as to be described later.

Step (S1)

Step (S1) is a step of forming a polyolefin block by polymerizing an olefin-based monomer using an organozinc compound as a chain transfer agent in the presence of a catalyst composition including a transition metal compound represented by Formula 1 below.

[Formula 1]

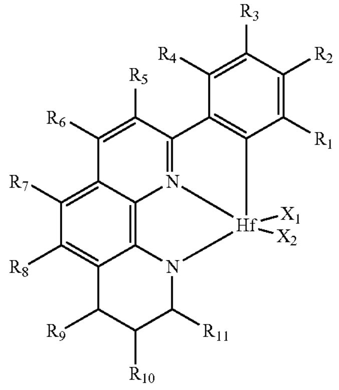

In Formula 1 above, $R_1$ to $R_{11}$ are each independently hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, two or more of $R_1$ to $R_{11}$ which are adjacent to each other may be connected to each other to form an aliphatic ring having 3 to 20 carbon atoms or an aromatic ring having 6 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio group having 6 to 20 carbon atoms, an alkylsilyl group having 1 to 20 carbon atoms, or an arylsilyl group having 6 to 20 carbon atoms.

When a polymerization reaction is performed in the presence of an excess of a chain transfer agent (e.g., $(Et)_2Zn$) with respect to a catalyst, an olefin polymer chain causes rapid transalkylation between zinc (Zn) and hafnium (Hf) to uniformly grow from dialkylzinc, thereby implementing living polymerization, which is referred to as coordinated chain transfer polymerization (CCTP). Metallocene catalysts typically used cannot be subjected to living polymerization through a β-elimination (β-elimination) process, and a small number of catalysts known to be applicable to CCTP only allow single polymerization of ethylene and an alpha-olefin, so that it is very difficult to perform the polymerization of ethylene and an alpha-olefin through CCTP. Therefore, it has been very difficult to perform living polymerization through CCTP using a common transition metal compound as a catalyst and to prepare a block copolymer.

On the other hand, a hafnium compound represented by Formula 1 above is a $[N^{amido},N,C^{aryl}]HfMe_2$-type composite including a 1,2,3,4-tetrahydro-1,10-phenanthroline skeleton and a Hf—C(aryl) bond, which exhibits excellent alpha-olefin incorporation capacity in the polymerization of ethylene and an alpha-olefin. Particularly, the molecular weight of an olefin polymer or the content of alpha-olefin varies depending on the content of a chain transfer agent, which indicates that the compound is successfully used in CCTP and a β-elimination reaction has rarely occurred enough to be ignored. That is, it is possible to perform the polymerization of ethylene and an alpha-olefin-based monomer as living polymerization through CCTP using the hafnium compound represented by Formula 1 above, and a block copolymer having various block compositions may be successfully prepared.

In addition, it is possible to convert and perform CCTP using the hafnium compound into an anionic styrene polymerization reaction to synthesize a polyolefin-polystyrene block copolymer. As described above, the hafnium compound may be usefully used as a catalyst for preparing an olefin polymer, which is a unique feature that may be achieved with a novel structure of the hafnium compound represented by Formula 1 above.

Specifically, in Formula 1 above, $R_1$ to $R_{11}$ may each independently be hydrogen, an alkyl group having 1 to 20 carbon atoms, a cycloalkyl group having 3 to 20 carbon atoms, or an aryl group having 6 to 20 carbon atoms. Preferably, $R_1$ to $R_{10}$ may be hydrogen, and at the same time, $R_{11}$ may be hydrogen, an alkyl group having 1 to 20 carbon atoms, or an aryl group having 6 to 20 carbon atoms. More preferably, $R_1$ to $R_{10}$ may be hydrogen, and at the same time, $R_{11}$ may be hydrogen, or an alkyl group having 1 to 20 carbon atoms.

Alternatively, in Formula 1 above, $R_1$ to $R_{11}$ may each independently be hydrogen, an alkyl group having 1 to 20 carbon atoms, or an aryl group having 6 to 20 carbon atoms. At this time, $R_3$ and $R_4$ may be connected to each other to form an aromatic ring having 5 to 20 carbon atoms, such as a benzene ring. Preferably, $R_3$ and $R_4$ may be connected to each other to form a benzene ring, and at the same time, $R_{11}$ may be an alkyl group having 1 to 20 carbon atoms, or an aryl group having 6 to 20 carbon atoms.

Alternatively, in Formula 1 above, $R_1$, $R_2$, and $R_5$ to $R_{10}$ may be hydrogen, $R_3$, $R_4$, and $R_{11}$ may each independently be hydrogen, or an alkyl group having 1 to 20 carbon atoms, wherein $R_3$ and $R_4$ may be connected to each other to form an aromatic ring having 5 to 20 carbon atoms, for example, a benzene ring.

Meanwhile, $X_1$ and $X_2$ may each independently be hydrogen, an alkyl group having 1 to 20 carbon atoms, a cycloalkyl group having 3 to 20 carbon atoms, or an aryl group having 6 to 20 carbon atoms, and preferably, may each independently be an alkyl group having 1 to 20 carbon atoms, wherein $X_1$ and $X_2$ may be the same as each other.

In the present invention, the term "alkyl" means a hydrocarbon moiety of a linear chain or a branched chain.

In the present invention, the term "alkenyl" means an alkenyl group of a linear chain or a branched chain.

In the present invention, "aryl" preferably has 6 to 20 carbon atoms, and may specifically be phenyl, naphthyl, anthracenyl, dimethylanilinyl, anisolyl, and the like, but is not limited thereto.

In the present invention, "alkylaryl" means an aryl group substituted by the alkyl group above.

In the present invention, "arylalkyl" means an alkyl group substituted by the aryl group above.

In the present specification, "alkylsilyl" may be silyl substituted with alkyl having 1 to 20 carbon atoms, for example, trimethylsilyl or triethylsilyl.

In the present invention, "alkylamino" means an amino group substituted by the alkyl group above, for example, a dimethylamino group, a diethylamino group, and the like, but is not limited thereto.

In the present invention, unless otherwise stated, "hydrocarbyl" means a monovalent hydrocarbon group having 1 to 20 carbon atoms and consisting only of carbon and hydrogen, such as alkyl, aryl, alkenyl, alkynyl, cycloalkyl, alkylaryl or arylalkyl, regardless of the structure thereof.

More specifically, the hafnium compound represented by Formula 1 above may be a hafnium compound represented by Formula 1a or 1b below.

[Formula 1a]

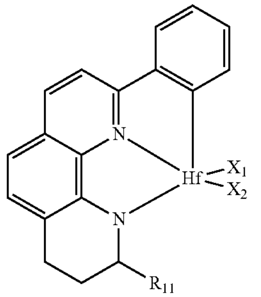

[Formula 1b]

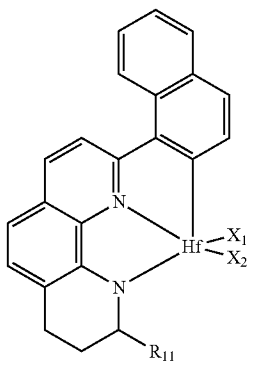

In Formula 1a and Formula 1b above, $R_{11}$ is hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio group having 6 to 20 carbon atoms, an alkylsilyl group having 1 to 20 carbon atoms, or an arylsilyl group having 6 to 20 carbon atoms.

The hafnium compound may be represented by any one among Formula 1-1 to Formula 1-5, but is not limited thereto. Any hafnium compound corresponding to Formula 1 is included in the present invention.

[Formula 1-1]

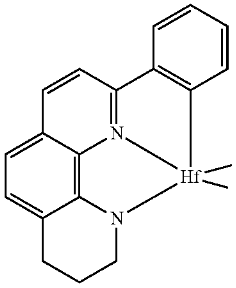

[Formula 1-2]

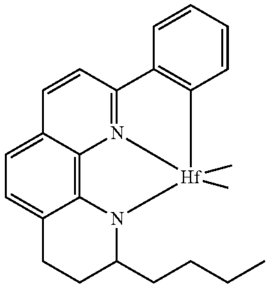

[Formula 1-3]

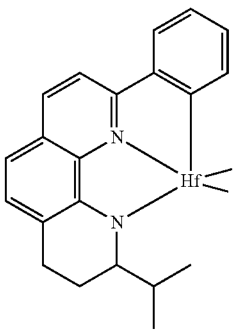

-continued

[Formula 1-4]

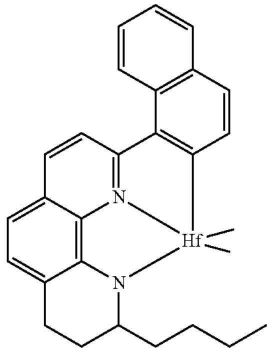

[Formula 1-5]

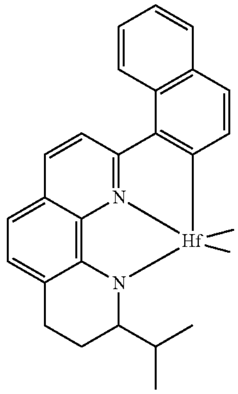

The hafnium compound of the present invention may be prepared by including a step of reacting a compound represented by Formula 2 below and a compound represented by Formula 3 below.

[Formula 2]

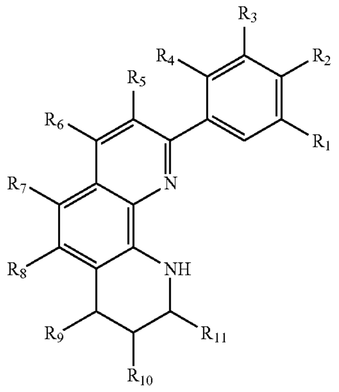

[Formula 3]

$Hf(X_1X_2)_2$

In the above formulas, the definitions of $R_1$ to $R_{11}$, and $X_1$ and $X_2$ are the same as described above.

Meanwhile, when a hafnium compound represented by Formula 1 above is prepared, depending on the structure of a finally prepared hafnium compound, a step of preparing a ligand compound may be performed differently as follows.

For example, when $R_3$ and $R_4$ do not form a ring with each other and $R_{11}$ is a hydrogen atom in a ligand compound, as shown below, the ligand compound may be prepared by hydrogenation under a ruthenium catalyst and then reacted with a compound represented by Formula 3, which is a hafnium precursor, to prepare a hafnium compound.

[Reaction Formula 1]

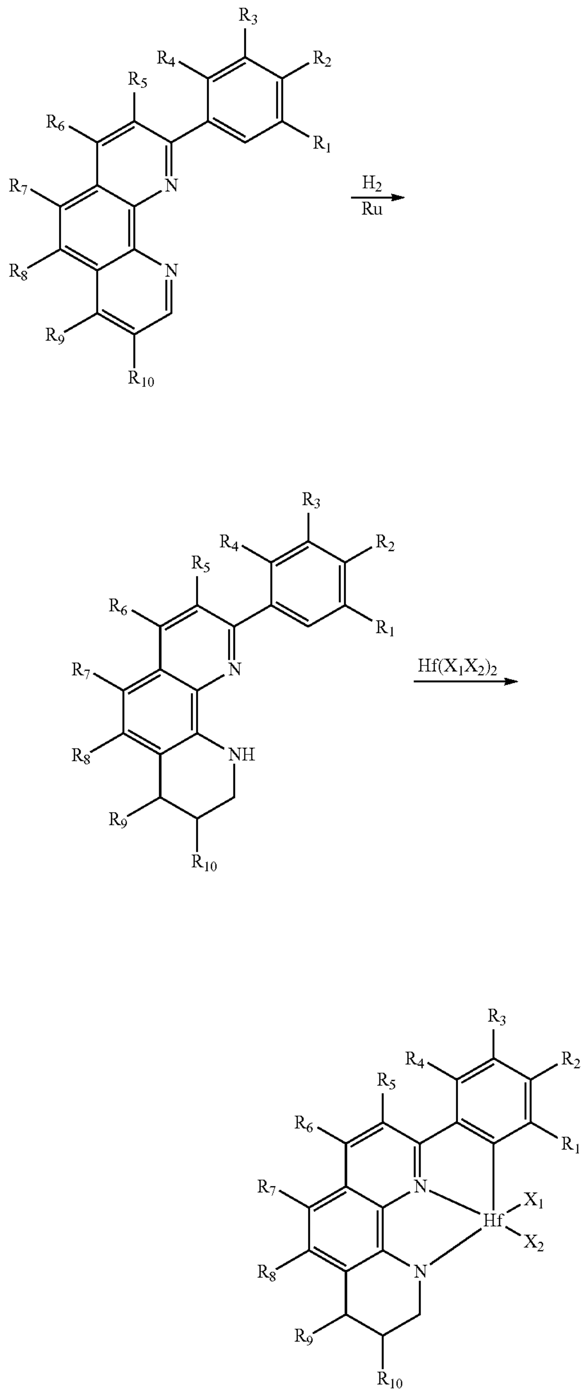

Alternatively, when $R_3$ and $R_4$ do not form a ring with each other and $R_{11}$ is a substituent, not a hydrogen atom, in a ligand compound structure, as shown in Reaction Formula 2 below, $R_{11}$ is first introduced using an organolithium compound and then hydrogenated under a ruthenium catalyst to prepare a ligand compound.

[Reaction Formula 2]

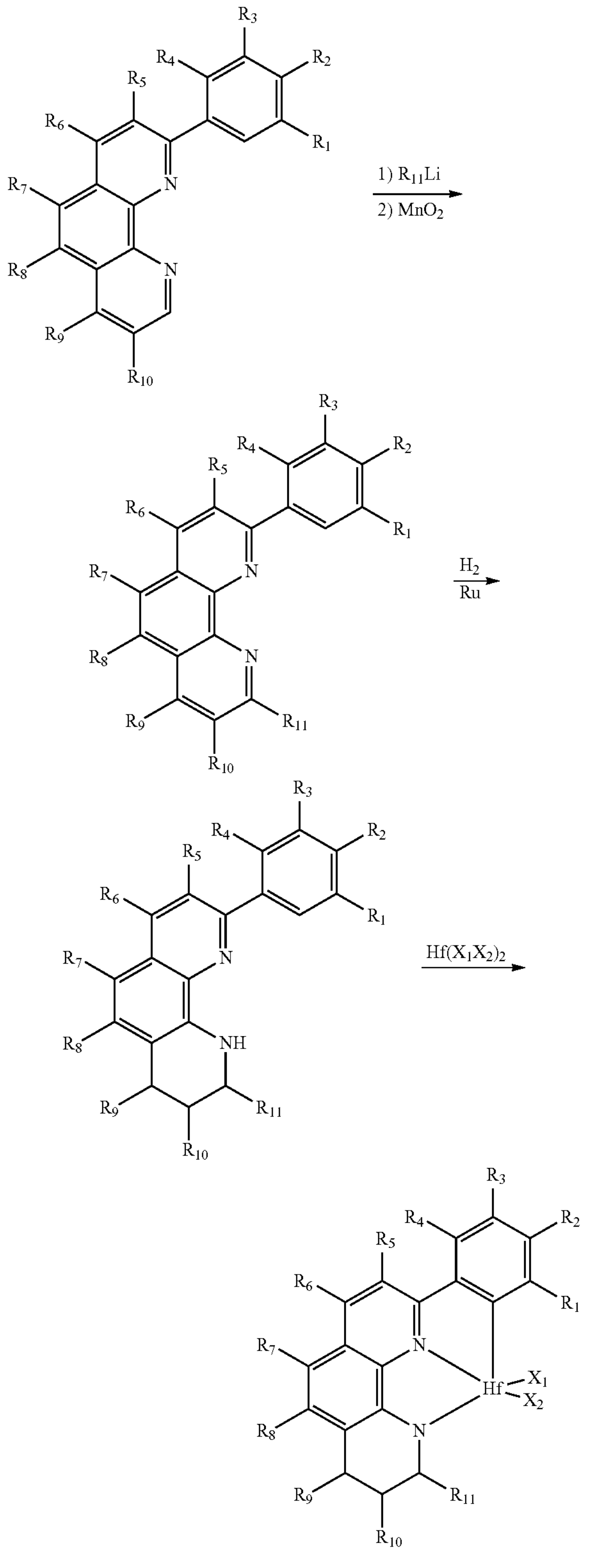

Alternatively, when $R_3$ and $R_4$ are connected to each other and form an aromatic ring having 5 to 20 carbon atoms and $R_{11}$ is a substituent, not a hydrogen atom, in a ligand compound structure, as shown below, $R_{11}$ may be first introduced using an organolithium compound and then, in order to prevent hydrogenation of an aromatic ring such as a naphthyl group, hydrogenated under a Pd/C catalyst to prepare a ligand compound.

[Reaction Formula 3]

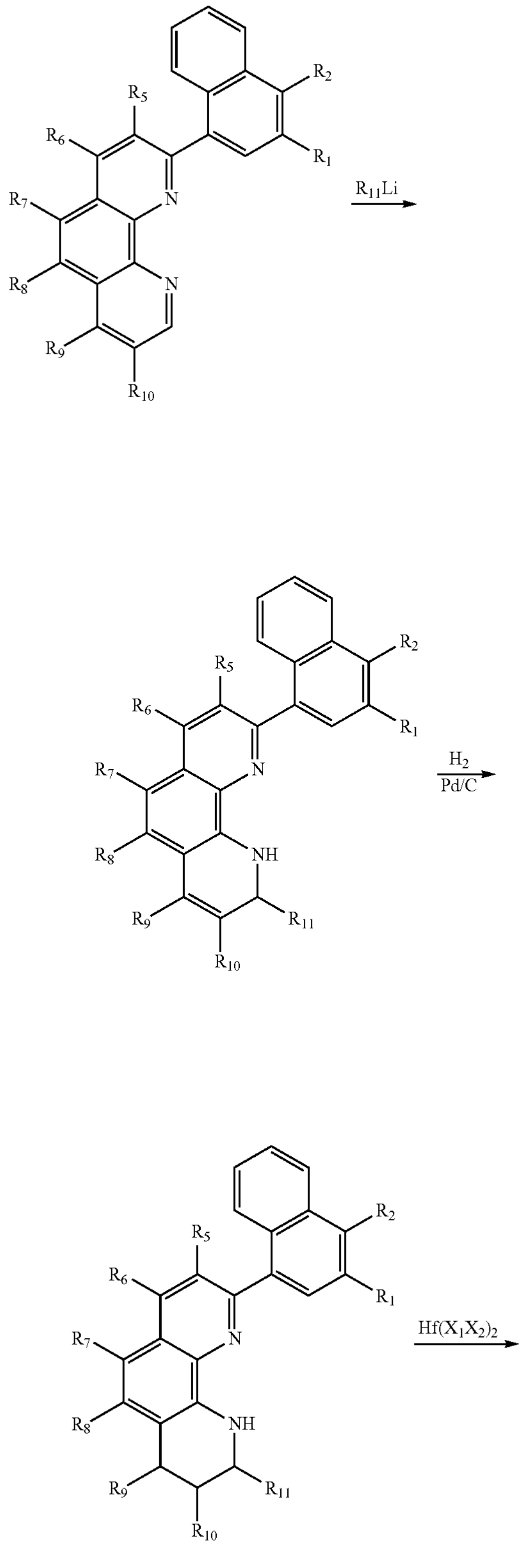

-continued

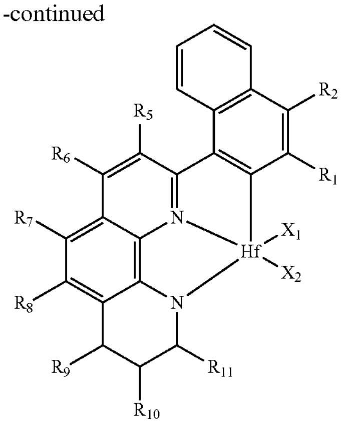

That is, the hafnium compound may be prepared by preparing a ligand compound through alkylation and hydrogenation of a compound, which is a precursor of a ligand compound, under suitable reagents and reaction conditions, and then introducing hafnium thereto. Specific types of alkylation reagents, reaction temperature and pressure, and the like may be appropriately changed by those skilled in the art in consideration of the structure and experimental conditions of a final compound.

In the present invention, the organozinc compound is a material used as a chain transfer agent which induces chain transfer during preparation in a polymerization reaction to allow a copolymer to be prepared, and may specifically be a compound represented by Formula 4 below.

[Formula 4]

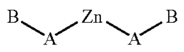

In Formula 4 above,

A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and B is arylene having 6 to 12 carbon atoms substituted with alkenyl having 2 to 12 carbon atoms.

Alternatively, A may be alkylene having 1 to 20 carbon atoms, arylene having 6 to 12 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and B may be arylene having 6 to 12 carbon atoms substituted with alkenyl having 2 to 8 carbon atoms.

Formula 4 may have a structure in which both ends of the formula are double bonds. For example, when B is arylene substituted with alkenyl, the arylene is connected to A and the double bond of the alkenyl substituted in the arylene may be located in the outermost portion of Formula 4.

When the organozinc compound is reacted with one or more kinds of olefin-based monomers in the presence of a catalyst composition, the olefin-based monomer may be inserted between zinc (Zn) and an organic group (A) of the organozinc compound to achieve polymerization.

The organozinc compound may be mixed in an amount of 1 to 200 equivalents based on 1 equivalent of a transition metal compound of Formula 1 above, specifically, in an amount of 10 to 100 equivalents based on 1 equivalent of the transition metal compound of Formula 1 above.

The organic zinc compound does not contain impurities such as THF and a large amount of magnesium salts, and thus, may be provided at high purity, and accordingly, may be used as a chain transfer agent, and is advantageous in olefin polymerization.

The catalyst composition may further include a co-catalyst compound. At this time, the co-catalyst compound serves to activate the transition metal compound represented by Formula 1, and as the co-catalyst, those known in the art may be used. For example, one or more selected from Formulas 5 to 7 below may be used as the co-catalyst.

$$-[Al(R_a)-O]_m- \qquad \text{[Formula 5]}$$

$$D(R_a)_3 \qquad \text{[Formula 6]}$$

$$[L\text{-}H]^+[Z(A)_4]^- \text{ or } [L]^+[Z(A)_4]^- \qquad \text{[Formula 7]}$$

In the above formulas, $R_a$ is each independently a halogen radical, a hydrocarbyl radical having 1 to 20 carbon atoms, or a hydrocarbyl radical having 1 to 20 carbon atoms substituted with halogen, m is an integer greater than or equal to 2, D is either aluminum or boron, L is a neutral or cationic Lewis acid, Z is a Group 13 element, A is each independently an aryl group having 6 to 20 carbon atoms in which one or more hydrogen atoms may be substituted with a substituent, or an alkyl group having 1 to 20 carbon atoms, and the substituent of A is halogen, hydrocarbyl having 1 to 20 carbon atoms, alkoxy having 1 to 20 carbon atoms, or aryloxy having 6 to 20 carbon atoms.

A compound represented by Formula 5 above is not particularly limited as long as it is alkylaluminoxane. Preferred examples thereof include methylaluminoxane, ethylaluminoxane, isobutylaluminoxane, butylaluminoxane and the like, and a particularly preferred compound is methylaluminoxane.

A compound represented by Formula 6 above is not particularly limited, but preferred examples thereof include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, tributylboron, and the like. A particularly preferred compound is selected from trimethylaluminum, triethylaluminum, and triisobutylaluminum.

Examples of a compound represented by Formula 7 above include, when z is boron, for example, dioctadecylmethylammonium tetrakis(pentafluorophenyl)borate$[(C_{18}H_{37})_2N(H)Me]^+[B(C_6F_5)_4]^-$, dioctadecylmethylammonium tetrakis(phenyl)borate, dioctadecylmethylammonium tetrakis[3,5-bis(trifluoromethyl)phenyl]borate tetrakis(phenyl)borate, triethylammonium tetraphenylborate, tributylammonium tetraphenylborate, trimethylammonium tetraphenylborate, tripropylammonium tetraphenylborate, trimethylammonium tetra(p-tolyl)borate, trimethylammonium tetra(o,p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilidium tetraphenylborate, N,N-diethylanilidium tetrapentafluorophenylborate, diethylammonium tetrapentafluorophenylborate, triphenylphosphonium tetraphenylborate, trimethylphosphonium tetraphenylborate, trimethylammonium tetraphenylborate, tripropylammonium tetraphenylborate, trimethylammonium tetra(p-tolyl)borate, tripropylammonium tetra(p-tolyl)borate, triethylammonium tetra(o,p-dimethylphenyl)borate, trimethylammonium tetra(o, p-dimethylphenyl)borate, tributylammonium tetra(p-trifluoromethylphenyl)borate, trimethylammonium tetra(p-trifluoromethylphenyl)borate, tributylammonium tetrapentafluorophenylborate, N,N-diethylanilinium tetraphenylborate, N,N-diethylanilinium tetrapentafluorophenylborate, diethylammonium tetrapentafluorophenylborate, triphenylphosphonium tetraphenylborate, triphenylcarbonium tetra(p-trifluoromethylphenyl)borate, triphenylcarbonium tetrapentafluorophenylborate, or a combination thereof, and when z is aluminum, for example, triethylammonium tetraphenylaluminum, tributylammonium tetraphenylaluminum, trimethylammonium tetraphenylaluminum, tripropylammonium tetraphenylaluminum, trimethylammonium tetra(p-tolyl) aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl) aluminum, tributylammonium tetrapentafluorophenylaluminum, N,N-diethylanilinium tetraphenylaluminum, N,N-diethylanilinium tetraphenylaluminum, N,N-diethylanilinium tetrapentafluorophenylaluminum, diethylammonuim tetrapentafluorophenylaluminium, triphenylphosphonium tetraphenylaluminum, trimethylphosphonium tetraphenylaluminum, triethylammonium tetraphenylaluminum, tributylammonium tetraphenylaluminum, or a combination thereof, but is not limited thereto.

Particularly, a co-catalyst used in the present invention may be a compound represented by Formula 7 above, and may specifically be dioctadecylmethylammonium tetrakis (pentafluorophenyl)borate.

In addition, the co-catalyst used in the present invention may be prepared in an anhydrous hydrocarbon solvent. For example, the hydrocarbon solvent may be one or more selected from the group consisting of butane, pentane, neopentane, hexane, cyclohexane, methylcyclohexane, heptane, octane, benzene, toluene, xylene, and ethylbenzene, but is not limited thereto. Any hydrocarbon solvent available in the art may be used in an anhydrous form.

In the present invention, when the co-catalyst is prepared in an anhydrous hydrocarbon solvent, in $^1H$ NMR spectrum, at least one peak appears in each of the range of 1.75 ppm to 1.90 ppm and the range of 1.90 ppm to 2.00 ppm. This indicates that protons attached to α-carbon adjacent to nitrogen, sulfur, or phosphorus included in L show different peaks. For example, when a compound represented by Formula 1 is $[(C_{18}H_{37})_2N(H)Me]^+[B(C_6F_5)_4]^-$, in the $^1H$ NMR spectrum thereof, two protons present in $NCH_2$ may each show a different signal.

In addition, the hafnium compound represented by Formula 1 and the co-catalyst may also be used in the form of being supported on a carrier. The carrier may be silica or alumina, but is not limited thereto.

An olefin monomer introduced as a reaction material in Step (S1) may be ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene, or a monomer formed of a mixture thereof, and the like. The olefin monomer may be used alone, or in combination of two or more thereof.

Step (S1) may be performed, for example, in a uniform solution state. At this time, as a solvent, a hydrocarbon solvent or olefin monomer itself may be used as a medium. The hydrocarbon solvent may be an aliphatic hydrocarbon solvent having 4 to 20 carbon atoms, specifically isobutane, hexane, cyclohexane, methylcyclohexane, and the like. The solvent may be used alone, or in combination of two or more thereof.

The polymerization temperature of Step (S1) may vary depending on reaction materials, reaction conditions, and the like, but may specifically be 70 to 170° C., specifically 80 to 150° C., or 90 to 120° C. Within the above range, the solubility of a polymer may be increased and a catalyst may be thermally stabilized.

The polymerization of Step (S1) may be performed in a batch, semi-continuous, or continuous manner, and may also be performed in two or more steps having different reaction conditions.

A compound prepared by the above-described Step (S1) may serve as a precursor for preparing the polyolefin-polystyrene-based multi-block copolymer of the present invention by an anionic polymerization reaction of Step (S2) to be described later.

Step (S2)

Step (S2) is a step performed in succession to Step (S1) and forming a polystyrene block by anionic polymerization of the polyolefin block and a styrene-based monomer in the presence of an alkyl lithium compound including silicon atom and a triamine compound to prepare a polyolefin-polystyrene-based multi-block copolymer.

In Step (S2), a styrene-based monomer may be continuously inserted between a zinc-carbon bond of (polyolefinyl) $_2$Zn included in the compound formed by the above-described Step (S1), and at the same time, a styrene group present in a terminal of the compound formed by Step (S1) may participate as a copolymerization site with the styrene-based monomer to be connected to a polystyrene chain. In addition, a multi-block copolymer prepared through the above process may be easily quenched by the reaction of an end group with water, oxygen, or an organic acid, through which the multi-block copolymer is converted into an industrially useful polyolefin-polystyrene-based multi-block copolymer.

The styrene-based monomer may be a styrene-based monomer having 6 to 20 carbon atoms. More specifically, the styrene-based monomer may be a styrene-based monomer including ethylene substituted with an aryl group having 6 to 20 carbon atoms, ethylene substituted with a phenyl group, and the like, for example, styrene.

The alkyl lithium compound including silicon atom may be a compound represented by Formula 8 below.

$(CH_3)_3Si(CH_2)Li$ [Formula 8]

The alkyl lithium compound including the silicon atom is a material widely used as an initiator of anionic polymerization, and is readily available to be used in the present invention.

The triamine compound may be a compound represented by Formula 9 below.

[Formula 9]

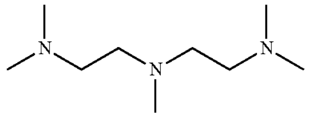

The triamine compound is a compound used for the purpose of improving the reactivity as a base or as a nucleophile of the alkyl lithium compound by coordinating well with lithium, and is readily available and inexpensive.

The present invention newly uses the compounds of Formulas 8 and 9 (e.g., $Me_3SiCH_2Li$·(PMDETA)) as an initiator of Step (S2), and thus, may suppress the generation amount of a polystyrene homopolymer, a polyolefin homopolymer, and a polyolefin-polystyrene diblock copolymer, and maximize the generation of a polyolefin-polystyrene-based multi-block copolymer, which is the object of the present invention.

The alkyl lithium compound including silicon atom and represented by Formula 8 and the triamine compound represented by Formula 9 may be mixed and introduced to an aliphatic hydrocarbon solvent, or the alkyl lithium compound including silicon atom and represented by Formula 8 and the triamine compound represented by Formula 9 may be sequentially introduced.

The anionic polymerization temperature of Step (S2) may vary depending on reaction materials, reaction conditions, and the like, but may specifically be 40 to 170° C., more specifically 60 to 150° C., or 90 to 100° C.

The anionic polymerization of Step (S2) may be performed in a batch, semi-continuous, or continuous manner, and may also be performed in two or more steps having different reaction conditions.

The anionic polymerization time of Step (S2) may vary depending on reaction materials, reaction conditions, and the like, but may specifically be 0.5 to 10 hours, 1 to 8 hours, 2 to 7 hours, or 4 to 6 hours. When within the above range, it is advantageous to convert the total amount of introduced styrene-based monomers into multi-block copolymers.

As described above, in the preparation method of the present invention, a polyolefin chain is grown through olefin polymerization using the above-described organozinc compound represented by Formula 4 above, and then styrene anionic polymerization is continuously performed to prepare a polyolefin-polystyrene-based multi-block copolymer, through which it is possible to efficiently prepare a polyolefin-polystyrene-based multi-block copolymer having improved physical properties compared to the prior art, and thus, may be easily used in the industry.

The method for preparing a polyolefin-polystyrene-based multi-block copolymer according to an example of the present invention is different from a typical method for preparing a polyolefin-polystyrene-based multi-block copolymer, in which styrene and diene are subjected to anionic polymerization, followed by a two-step process of hydrogenation, and is characterized in that a polyolefin-polystyrene-based multi-block copolymer is prepared without a hydrogenation reaction on a double bond in a copolymer main chain. Accordingly, a polyolefin-polystyrene-based multi-block copolymer included in the thermoplastic resin composition of the present invention is characterized in that the polyolefin-polystyrene-based multi-block copolymer does not contain an unsaturated bond which is not saturated and is present during a hydrogenation process for a double bond of a main chain.

Meanwhile, in order to satisfy the use and physical properties required accordingly, the thermoplastic resin composition according to an embodiment of the present invention having the above-described composition may include each component in an appropriate content. For example, in the present invention, the thermoplastic resin composition may include the (1) polypropylene and the (2) polyolefin-polystyrene-based multi-block copolymer in a weight ratio of 10:90 to 90:10, specifically in a weight ratio of 20:80 to 80:20, more specifically, in a weight ratio of 40:60 to 60:40. The thermoplastic resin composition according to the present invention includes the polypropylene and the polyolefin-polystyrene-based multi-block copolymer in the above weight ratio, and thus, may exhibit improved low-temperature and room temperature impact strength properties as well as high fluidity properties. When the content of the polyolefin-polystyrene-based multi-block copolymer included in the thermoplastic resin composition is too small, the impact strength may be degraded, and when the content the polyolefin-polystyrene-based multi-block copolymer is excessive, the fluidity of the thermoplastic resin composition may be degraded. The mixing ratio may be controlled in consideration of the significance of the physical properties of the polypropylene and the polyolefin-polystyrene-based multi-block copolymer.

The thermoplastic resin composition according to the present invention includes a polyolefin-polystyrene-based multi-block copolymer which satisfies the conditions (a) to (d), and thus, may exhibit excellent low-temperature and room temperature impact strength even when a relatively small amount of the polyolefin-polystyrene-based multi-block copolymer is included.

The thermoplastic resin composition according to an embodiment of the present invention may selectively further include an inorganic filler together with the polypropylene and the polyolefin-polystyrene-based multi-block copolymer to improve the mechanical properties of the thermoplastic resin composition.

The inorganic filler may be a powder-type filler, a flake-type filler, a fibrous filler, or a balloon-type filler, and any one thereof or a mixture of two or more thereof may be used. Specifically, the powder-type filler may be a natural silicic acid or silicate such as fine powder talc, kaolinite, calcined clay, or sericite, a carbonate such as a precipitated calcium carbonate, a heavy calcium carbonate or a magnesium carbonate, a hydroxide such as an aluminum hydroxide or a magnesium hydroxide, an oxide such as a zinc oxide, a magnesium oxide, or a titanium oxide, a synthetic silicic acid or silicate such as a hydrous calcium silicate, a hydrous aluminum silicate, a hydrous silicic acid or an silicic anhydride, and silicon carbide, and the like. In addition, the flake-type filler may be mica, and the like. The fibrous filler may be a basic sulfuric acid magnesium whisker, a calcium titanate whisker, a boric acid aluminum whisker, sepiolite, processed mineral fiber (PMF), potassium titanate, or the like. In addition, the balloon-type filler may be a glass balloon and the like. Among the above, the inorganic filler may be talc.

In addition, the inorganic filler may be surface-treated to improve the strength properties and molding processability of the thermoplastic resin composition.

Specifically, the inorganic filler may be physically or chemically surface-treated using a surface treatment agent such as a silane coupling agent, a higher fatty acid, a fatty acid metal salt, an unsaturated organic acid, an organic titanate, a resin acid, or polyethylene glycol.

In addition, the average particle diameter ($D_{50}$) of the inorganic filler may be 1 μm to 20 μm, specifically 3 μm to 15 μm, more specifically 5 μm to 10 μm. When the average particle diameter of the inorganic filler is too small, it is difficult to achieve uniform dispersion when mixed with polypropylene and a polyolefin-polystyrene-based multi-block copolymer due to the aggregation between inorganic filler particles, and as a result, the effect of improving the mechanical properties of the thermoplastic resin composition may be insignificant. In addition, when the average particle diameter of the inorganic filler is excessive, there is a risk of physical properties degradation due to the degradation in the dispersibility of the inorganic filler itself.

In the present invention, the average particle diameter ($D_{50}$) of the inorganic filler may be defined as a particle diameter at 50% of a particle diameter distribution. In the present invention, the average particle diameter ($D_{50}$) of the inorganic filler may be measured, for example, by electron microscopy using a scanning electron microscope (SEM) or a field emission scanning electron microscopy (FE-SEM), or by a laser diffraction method. Specifically, when measured by a laser diffraction method, inorganic filler particles may be dispersed in a dispersion medium, and then introduced into a commercially available laser diffraction particle size measuring device (e.g., Microtrac MT 3000) to measure the average particle diameter ($D_{50}$) at 50% of a particle size distribution in the measuring device.

The above-described inorganic filler may be included in an amount of 0.1 parts by weight to 40 parts by weight based on 100 parts by weight of the thermoplastic resin composition. When the content of the inorganic filler in a thermoplastic resin composition is less than 0.1 parts by weight based on 100 parts by weight of the thermoplastic resin composition, the improvement effect according to the inclusion of the inorganic filler is insignificant, and when greater than 40 parts by weight, the processability of the thermoplastic resin composition may be degraded. More specifically, the inorganic filler may be included in an amount of 0.1 wt % to 20 wt % based on total weight of the thermoplastic resin composition.

The thermoplastic resin composition according to an embodiment of the present invention which satisfies the above-described composition and content conditions may be prepared by adding polypropylene and selectively an inorganic filler to a polyolefin-polystyrene-based multi-block copolymer, followed by performing heat treatment. At this time, the type and the content of the polypropylene are the same as described above.

The mixing process may be performed according to a typical method. Specifically, the mixing may be performed using a super mixer or a ribbon mixer.

In addition, as required in the mixing process, an additive such as an antioxidant, a thermal stabilizer, a UV stabilizer, an antistatic agent, and the like may be further included, and in order to improve paintability, a small amount of adhesive resin or an additive having polar group may be selectively further used within an appropriate content range.

In addition, the heat treatment process may be performed at a temperature above the melting point of polypropylene and 210° C. or below. The heat treatment process may be performed using various blending processing devices such as a twin-screw extruder, a single-screw extruder, a roll-mill, a kneader, or a banbury mixer.

The thermoplastic resin composition according to an embodiment of the present invention prepared according to the preparation method as described above may exhibit excellent low-temperature impact strength properties as well as high fluidity properties, and additionally, may exhibit excellent room temperature impact strength properties.

Specifically, the thermoplastic resin composition may satisfy the physical properties of the following (A) to (C).

(A) Room temperature impact strength of 3 to 100 kgf·m/m (B) Low-temperature (−40° C.) impact strength of 2 to 120 kgf·m/m (C) Melt flow rate (MFR, 230° C. and 2.16 kg) of 0.5 to 200 g/10 min (A) The room temperature impact strength may be 3 to 100 kgf·m/m, specifically 20 to 100 kgf·m/m, and more specifically 30 to 90 kgf·m/m as measured by the ASTM D256 method.

(B) The low-temperature impact strength may be 2 to 120 kgf·m/m, specifically 10 to 110 kgf·m/m, and more specifically 22 to 80 kgf·m/m as measured at a low temperature (−40° C.) by the ASTM D256 method.

(C) The melt flow rate (MFR) may be 0.5 to 200 g/10 min, specifically 3 to 100 g/10 min, and more specifically 7 to 50 g/10 min, as measured under the condition of 230° C. and a 2.16 kg load according to ASTM-D 1238.

The thermoplastic resin composition according to an embodiment of the present invention is useful for hollow molding, extrusion molding, or injection molding in various fields and applications for packaging, construction, household products, and the like, such as materials for automobiles, electric wires, toys, textiles, or medical products. Particularly, the thermoplastic resin composition has excellent toughness and impact strength at a low temperature as well as room temperature, and also has excellent physical properties such as heat resistance and rigidity, and thus, may be usefully used for interior and exterior parts of automobiles.

According to another embodiment of the present invention, there are provided a molded body and an automotive part manufactured by using a thermoplastic resin composition satisfying the above-described physical property requirements.

The molded body may specifically be a blow molding molded body, an inflation molded body, a cast molded body, an extrusion laminate molded body, an extrusion molded body, a foam molded body, an injection molded body, a sheet, a film, a fiber, a monofilament, a non-woven fabric, or the like.

In addition, the automotive part may be interior-exterior parts for automobiles, and the like.

EXAMPLES

Hereinafter, the present invention will be described in detail with reference to examples. However, the following examples are merely illustrative of the present invention and are not intended to limit the scope of the present invention.

<Preparation of Transition Metal Compound>

Preparation Example 1

(i) Preparation of Ligand Compound

Isopropyllithium (0.45 mL, 0.36 mmol, 0.79 M in pentane) was slowly added to 2-naphthyl-1,10-phenanthroline (0.789 g, 2.58 mmol) in toluene (8 mL) at −10° C. After performing stirring at room temperature for 3 hours, degassed $H_2O$ (3 mL) was added. The aqueous layer was removed by a syringe under $N_2$. The solvent was removed using a vacuum line, and the residue was dissolved in degassed ethanol (15 mL) and THF (5 mL). The solution was transferred to a bomb reactor containing Pd/C (0.242 mmol, 10 mol %) under $N_2$. After $H_2$ gas was charged to 5 bar, the mixture was stirred at room temperature for 12 hours. The $H_2$ gas was released and the catalyst residue was filtered on celite and removed. The solvent was removed, and the residue was purified by silica gel column chromatography using ethyl acetate/hexane (1/3, v/v). A pale yellow sticky solid was obtained (0.085 g, 73%). $^1$H NMR and $^{13}$C NMR spectra are shown in FIG. 1.

$^1$H NMR ($C_6D_6$): δ 8.58 (d, J=7.8 Hz, H), 7.75 (d, J=9.0 Hz, H), 7.70 (d, J=9.6 Hz, H), 7.66 (d, J=7.2 Hz, H), 7.63 (d, J=6.6 Hz, H), 7.32 (m, 4H), 7.18 (d, J=8.4 Hz, H), 6.99 (d, J=7.8 Hz, H), 6.39 (s, H, NH), 2.93 (m, H), 2.79 (m, H), 2.70 (dt, J=4.8 Hz, H), 1.70 (m, H), 1.63 (m, H), 1.47 (m, H), 0.81 (d, J=7.2 Hz, 3H, $CH(CH_3)_2$), 0.76 (d, J=7.2 Hz, 3H, $CH(CH_3)_2$) ppm.

$^{13}C\{^1H\}$ NMR($C_6D_6$): δ 18.34, 18.77, 24.43, 26.78, 32.52, 56.73, 112.78, 116.67, 122.62, 125.59, 126.10, 126.51, 126.61, 126.86, 128.14, 128.69, 129.03, 129.28, 132.20, 134.71, 136.41, 137.64, 139.79, 141.75, 155.92 ppm.

m/z calcd ([M$^+$] $C_{25}H_{24}N_2$) 352.4800. Found: 352.1942.

(ii) Preparation of Transition Metal Compound

[Formula 1-3]

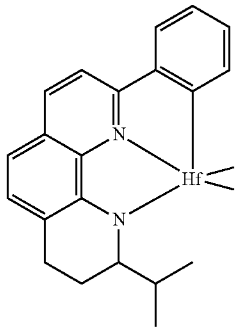

MeMgBr (1.24 mL, 3.11 M in diethyl ether) was added dropwise to a stirred suspension (0.300 g, 0.938 mmol) of $HfCl_4$ in toluene (8 mL) at −78° C. After performing stirring for 1 hour at a temperature in the range of −40° C. and −35° C., the solution was cooled to −78° C. again. A solution (0.24 g, 0.94 mmol) of a ligand compound (0.366 g, 1.00 mmol) in toluene (4 mL) was added dropwise. The resulting solution was stirred for 2 hours at a controlled temperature in the range of −40° C. and −35° C., and then stirred at room temperature overnight. The solvent was removed using a vacuum line, and the residue was extracted with toluene (50 mL). Dark brown powder (0.226 g, 47%) was obtained by performing pulverization in hexane. $^1$H NMR and $^{13}$C NMR spectra are shown in FIG. 2.

$^1$H NMR ($C_6D_6$): δ 8.66 (d, J=7.8 Hz, H), 8.50 ((d, J=7.8 Hz, H), 7.92 ((d, J=9.0 Hz, H), 7.83 ((d, J=7.2 Hz, H), 7.76 ((d, J=8.4 Hz, H), 7.62 ((d, J=7.8 Hz, H), 7.40 (td, J=7.2 Hz, H), 7.32 (m, H), 7.14 ((d, J=7.8 Hz, H), 6.77 ((d, J=7.2 Hz, H), 4.02 (m, H), 2.80 (m, H), 2.62 ((dt, J=6.0 Hz, H), 2.55 (m, H), 1.88 (m, H), 1.72 (m, H), 1.09 and 1.04 ((d, J=6.6 Hz, 6H, $CH(CH_3)_2$), 0.82 (s, 3H, $HfCH_3$), 0.81 (s, 3H, $HfCH_3$) ppm.

$^{13}C\{^1H\}$ NMR($C_6D_6$): δ 18.55, 21.28, 23.07, 25.44, 32.58, 60.98, 63.06, 66.88, 112.37, 119.64, 120.21, 124.55, 125.48, 126.81, 126.97, 129.31, 129.97, 130.26, 131.25, 133.82, 135.51, 140.97, 141.44, 143.94, 150.14, 164.58, 209.13 ppm.

Anal. Calcd. ($C_{27}H_{28}HfN_2$): C, 58.01; H, 5.05; N, 5.01%. Found: C, 57.91; H, 5.01; N, 5.11%.

<Preparation of Co-Catalyst>

Excess $K^+[B(C_6F_5)_4]^-$ (0.633 g, 0.881 mmol, assuming pure) was reacted with a solution of $[(C_{18}H_{37})_2N(H)Me]^+[Cl]^-$ (0.404 g, 0.705 mmol) in toluene (anhydrous, 10 mL) for 1 hour at room temperature in a glove box. After filtered on celite, the solvent was removed using a vacuum line. The residue was dissolved in methylcyclohexane (4 mL) and then filtered again on celite. The solvent was removed to produce a yellow oil compound, which was used without further purification (0.797 g, 93%).

$^1$H NMR ($C_6D_6$): δ 3.15 (br, H, NH), 1.97 (m, 2H, $NCH_2$), 1.80 (m, H, $NCH_2$), 1.51 ((d, J=6.0 Hz, 3H, $NCH_3$), 1.45-1.29 (m, 48H), 1.26 (quintet, J=7.2 Hz, 4H), 1.13 (quintet, J=7.2 Hz, 4H), 0.94 (t, J=7.8 Hz, 6H), 0.88 (quintet, J=7.8 Hz, 4H), 0.81 (m, 4H) ppm.

$^{19}$F NMR($C_6D_6$): δ −132.09, −161.75, −165.98.

<Preparation of Organozinc Compound>

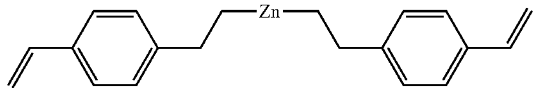

Borane dimethyl sulfide (1.6 mL, 3.2 mmol) was slowly introduced to triethylborane (0.6 g) in stirring and then reacted for 90 minutes. The mixture was slowly introduced to divinylbenzene (3.8 g) dissolved in anhydrous diethylether (10 mL) cooled to −20° C. and then stirred overnight. The solvent was removed with a vacuum pump and then diethylzinc (0.8 g) was added. The reaction was performed at 0° C. for 5 hours while removing triethylborane generated through distillation under reduced pressure. At 40° C., excess divinylbenzene and diethylzinc were removed by distillation under reduced pressure. Methylcyclohexane (150 mL) was added to dissolve the product again, and then a solid compound produced as a by-product was filtered using celite and removed to prepare an organozinc compound represented by the above formula.

<Preparation of Polyolefin-Polystyrene-Based Multi-Block Copolymer>

Implemented Preparation Example 1

A Parr reactor (1 gallon) was vacuum-dried at 120° C. for 2 hours. A solution of $Oc_3Al$ (trioctylaluminum, 1466.4 mg, 1,000 μmol-Al) in methylcyclohexane (1,200 g) was added to the reactor. The mixture was stirred at 120° C. for 1 hour using a heating jacket, and then the solution was removed using a cannula.

The reactor was filled with methylcyclohexane (1,200 g) containing $Oc_3Al$ (1466.4 mg, 1,000 μmol-Al/25 wt % in hexane) as a scavenger, and was filled with 1-hexene (560 g) as an olefin monomer, and the temperature was set to 90° C. A solution of the organozinc compound (3,100 μmol) in methylcyclohexane (3.85 g) was filled as a chain transfer agent, and then a methylcyclohexane solution (1.68 g) containing the transition metal compound (12.0 μmol-Hf) of Preparation Example 1 activated with $[(C_{18}H_{37})_2N(H)Me]^+[B(C_6F_5)_4]^-$ (12.0 μmol) in methylcyclohexane was injected. Polymerization was performed for 40 minutes while maintaining the pressure in the reactor at 25 bar by opening a valve of an ethylene tank. The temperature was adjusted within the range of 90 to 120° C., and the remaining ethylene gas was discharged.

When the temperature reached 90° C., a $Me_3SiCH_2Li$·(PMDETA) solution prepared by mixing $Me_3SiCH_2Li$ (244.8 mg, 2.6 mmol) PMDETA (495.1 mg, 2.86 mmol) in methylcyclohexane (3.85 g) was added. The temperature was maintained at 90° C. for 30 minutes during stirring, and then styrene (104.0 g) was injected. The temperature was adjusted in the range of 90 to 100° C. using a heating jacket.

From the $^1$H NMR analysis of an aliquot, complete conversion of styrene was confirmed. After the complete conversion of styrene, 2-ethylhexanoic acid and ethanol were continuously injected. An obtained polymer mass (300 g) was dried overnight in a vacuum oven at 80° C. to prepare a polyolefin-polystyrene-based multi-block copolymer.

Implemented Preparation Example 2

A polyolefin-polystyrene-based multi-block copolymer was prepared in the same manner as in Implemented Preparation Example 1, except that the amount of the organozinc compound and the amount of styrene used were different as shown in Table 1 below.

Implemented Preparation Examples 3 and 4

Polyolefin-polystyrene-based multi-block copolymers were each prepared by repeating the same method as in Implemented Preparation Example 1.

Comparative Preparation Example 1

As the commercially obtained SEBS, G1651 of Kraton Company was used.

Comparative Preparation Example 2

Using a compound represented by the following formula as a transition metal compound, a polyolefin-polystyrene-based multi-block copolymer was prepared by the following method.

[Comparative Formula 1]

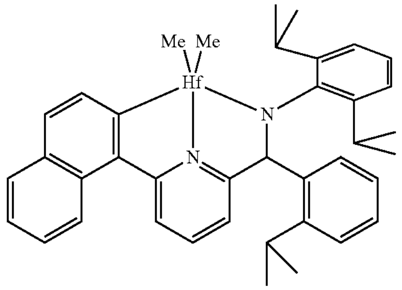

A trimethylaluminum (14.4 mg, 200 umol-Al) solution dissolved in methylcyclohexane (17 g) was injected into a high-pressure reactor. A catalyst poison in the high-pressure reactor was purged at 100° C. for 1 hour, and the solution was removed using a cannula.

The organozinc compound (49.1 mg, 150 μmol) was dissolved in methylcyclohexane (40 g) and introduced to the high-pressure reactor, and the temperature was raised to 80° C. A solution obtained by stirring the transition metal compound and $(C_{18}H_{37})N(Me)H^+[B(C_6F_5)_4]^-$ (4.0 μmol) in benzene for 2 hours was diluted with a solution (1.0 g) obtained by dissolving trioctylaluminum (50 μmol, 18.3 mg)

in methylcyclohexane (15 g). After a catalyst solution was injected into the high-pressure reactor, an ethylene-propylene mixed gas was immediately injected thereto at a pressure of 20 bar (propylene 10 bar). The temperature was adjusted in the range of 95 to 115° C. The pressure was gradually decreased due to the consumption of monomers, and a polymerization process was performed at 45° C. for 60 minutes, followed by discharging the remaining gas.

$Me_3SiCH_2Li$ (150 μmol, 14.1 mg) and PMDETA (150 μmol, 26 mg) were mixed with methylcyclohexane (1.0 g) and then injected into the reactor, followed by stirring for 30 minutes. The stirring temperature was maintained at 90° C. to 100° C. Styrene (7.8 g) was injected into the high-pressure reactor, and then reacted for 5 hours while maintaining the temperature at 90° C. to 100° C. to completely convert styrene monomers. After the complete conversion of the styrene monomers, acetic acid and ethanol were continuously injected. A polymer was obtained, and then dried overnight in a vacuum oven at 180° C.

then the TCE-d2 solvent peak was calibrated to 6.0 ppm. $CH_3$ of 1-propylene was confirmed at 1 ppm and a $CH_3$-related peak (triplet) of a butyl branch by 1-hexene was confirmed near 0.96 ppm to calculate the contents. In addition, the content of styrene was calculated using an aromatic peak near 6.5 to 7.5 ppm.

(2) Weight Average Molecular Weight (Mw, g/Mol) and Polydispersity Index (PDI)

The weight average molecular weight (Mw, g/mol) and the number average molecular weight (Mn, g/mol) were measured by gel permeation chromatography (GPC), respectively, and the weight average molecular weight was divided by the number average molecular weight to calculate the polydispersity index (PDI).

Column: PL Olexis
Solvent: TCB (trichlorobenzene)
Flow rate: 1.0 ml/min
Sample concentration: 1.0 mg/ml
Injection amount: 200 μl

TABLE 1

| | Catalyst type | Catalyst introduction amount (umol) | Co-catalyst (umol) | Zn (umol) | Alpha-olefin Type | Alpha-olefin Introduction amount | Styrene (g) | Chain transfer reaction temperature, time |
|---|---|---|---|---|---|---|---|---|
| Implemented Preparation Example 1 | Formula 1-3 | 12.0 | 12.0 | 3,100 | 1-hexene | 560 g | 104 | 90 to 120° C. 40 min |
| Implemented Preparation Example 2 | Formula 1-3 | 12.0 | 12.0 | 3,720 | 1-hexene | 560 g | 109 | 90 to 120° C. 40 min |
| Implemented Preparation Example 3 | Formula 1-3 | 12.0 | 12.0 | 3,100 | 1-hexene | 560 g | 104 | 90 to 120° C. 40 min |
| Implemented Preparation Example 4 | Formula 1-3 | 12.0 | 12.0 | 3,100 | 1-hexene | 560 g | 104 | 90 to 120° C. 40 min |
| Comparative Preparation Example 1 | Commercially obtained SEBS (G1651) | | | | | | | |
| Comparative Preparation Example 2 | Comparative Formula 1 | 4.0 | 4.0 | 150 | Propylene | 10 bar | 7.8 g | 90 to 120° C. 40 min |

Experimental Example 1

For the polyolefin-polystyrene-based multi-block copolymers of Implemented Preparation Examples 1 to 3 and Comparative Preparation Example 1, the physical properties of each of the copolymer were measured according to the following conditions and methods, and the results are shown in Table 2 below.

(1) Measurement of Content of Ethylene, Alpha-Olefin, and Styrene

The measurement was performed through nuclear magnetic resonance (NMR). Using Bruker 600 MHz AVANCE III HD NMR device, $^1H$ NMR was measured under the condition of ns=16, d1=3s, solvent=TCE-d2, and 373K, and Column temperature: 160° C.
Detector: Agilent High Temperature RI detector
Standard: Polystyrene
Calculate molecular weight by Universal calibration using the Mark-Houwink equation ($K=40.8\times10^{-5}$, $\alpha=0.7057$)

(3) Calculation of Constants A to D in Equation 1

In order to calculate values of the constants A to D, GPC measurement data was fitted with a Gaussian function using Origin's Nonlinear Curve Fit.

In addition, FIG. 3 illustrates a graph showing the polyolefin-polystyrene-based multi-block copolymer obtained in Implemented Preparation Example 1 by Equation 1.

TABLE 2

| | Composition | | | GPC | | Constant | | | |
|---|---|---|---|---|---|---|---|---|---|
| | Ethylene (wt %) | Alpha-olefin (wt %) | Styrene (wt %) | Mw (g/mol) | PDI | A | B | C | D |
| Implemented Preparation Example 1 | 43.3 | 31.1 | 25.6 | 144,188 | 1.67 | 0.00502 | 5.01307 | 0.98947 | 0.72544 |
| Implemented Preparation Example 2 | 43.6 | 31.9 | 24.5 | 160,889 | 1.77 | −0.02399 | 5.05566 | 1.05495 | 0.83622 |
| Implemented Preparation Example 3 | 41.4 | 36.6 | 22.1 | 191,669 | 1.81 | −0.0369 | 5.12906 | 1.08269 | 0.87756 |
| Implemented Preparation Example 4 | 42.5 | 32.1 | 25.4 | 180,236 | 1.79 | −0.00914 | 5.08700 | 1.02180 | 0.81827 |
| Comparative Preparation Example 1 | 43.4 | 24.8 | 31.8 | 139,300 | 1.10 | 0.02908 | 5.11902 | 0.95502 | 0.32777 |
| Comparative Preparation Example 2 | 39.9 | 22.1 | 38.0 | 93,075 | 1.73 | 0.01583 | 4.84804 | 0.96417 | 0.70169 |

Experimental Example 2

For the polyolefin-polystyrene-based multi-block copolymers of Implemented Preparation Examples 1 to 3 and Comparative Preparation Example 1, peak values of a branching point carbon atom and a terminal carbon atom of a branched chain branched from the branching point are summarized and described in Table 3 below.

Specifically, Bruker AVANCEIII 500 MHz NMR was used as a device, and about 50 mg of a sample was added in 1.2 ml of TCE-d2 (tetrachloroethane-d2) as a solvent, and heated at 100° C. in a heating block for 1 hour during which vortexting was performed 2 to 3 times. The sample was confirmed to be uniformly melted, and then transferred to an MNR tube to measure $^{13}C$ NMR spectrum at 100° C.

TABLE 3

| | Carbon atom of the branching point | Terminal carbon atom of branched chain |
|---|---|---|
| Implemented Preparation Example 1 | 38 | 14 |
| Implemented Preparation Example 2 | 38 | 14 |
| Implemented Preparation Example 3 | 38 | 14 |
| Implemented Preparation Example 4 | 38 | 14 |
| Comparative Preparation Example 1 | 34 | 11 |
| Comparative Preparation Example 2 | 30 | 23 |

Experimental Example 3

(1) Tensile Properties

Each test piece was prepared according to the tensile test method of ASTM D412, and the tensile strength, elongation, and 300% modulus thereof were measured.

TABLE 4

| | Tensile strength (MPa) | Elongation (%) | 300% Modulus (MPa) |
|---|---|---|---|
| Implemented Preparation Example 1 | 24.5 | 2,103 | 2.2 |
| Implemented Preparation Example 2 | 22.9 | 1,904 | 2.1 |
| Implemented Preparation Example 3 | 17.8 | 2,477 | 1.2 |
| Implemented Preparation Example 4 | 24.1 | 1,959 | 1.9 |
| Comparative Preparation Example 1 | 27.6 | 1,849 | 1.8 |
| Comparative Preparation Example 2 | 4.3 | 490 | 2.3 |

As shown in Table 4, it was confirmed that the block copolymer of Implemented Preparation Example 1, compared to the copolymer of Comparative Preparation Example 1 which does not satisfy all of the above conditions, exhibited properties in that tensile properties of tensile strength, elongation, and 300% modulus were all excellent at a predetermined level.

Example 1—Preparation of Thermoplastic Resin Composition

To 50 parts by weight of the polyolefin-polystyrene-based multi-block copolymer prepared in Implemented Preparation Example 1 above, 50 parts by weight of highly crystalline impact copolymer polypropylene (CB5230, product of Korea Petrochemical Ind. Co., LTD) having a melt index (230° C., 2.16 kg) of 30 g/10 min was added, and solution blending was performed in xylene using a reactor to prepare a thermoplastic resin composition compound. At this time, the temperature was 200° C. to 230° C., the impeller rotation speed was 400 rpm, and the blending time was 4 hours. After the blending was finished, the compound was recovered and then dried overnight in a 100° C. vacuum oven.

Examples 2 to 4—Preparation of Thermoplastic Resin Composition

A thermoplastic resin composition compound was prepared in the same manner as in Example 1 except that the polyolefin-polystyrene-based multi-block copolymer prepared in each of Implemented Preparation Example 2 to 4 was used instead of the polyolefin-polystyrene-based multi-block copolymer prepared in Implemented Preparation Example 1.

Comparative Examples 1 and 2—Preparation of Thermoplastic Resin Composition

A thermoplastic resin composition compound was prepared in the same manner as in Example 1 except that the polyolefin-polystyrene-based multi-block copolymer prepared in each of Comparative Preparation Examples 1 and 2 was used instead of the polyolefin-polystyrene-based multi-block copolymer prepared in Implemented Preparation Example 1.

Experimental Example 4

1) Low-Temperature Impact Strength

Performed according to ASTM D256, the low-temperature impact strength was measured after performing aging by leaving a target at a low temperature (−40° C.) for 6 hours or more.

2) Melt Flow Rate (MFR)

The measurement was performed under the condition of 230° C. and a 2.16 kg load according to ASTM-D 1238.

TABLE 5

| | Composition of multi-block copolymer | | | Content of | Low-temperature | MFR |
|---|---|---|---|---|---|---|
| | Ethylene (wt %) | Alpha-olefin (wt %) | Styrene (wt %) | multi-block copolymer wt % | impact strength Kgf · m/m | (230° C. 2.16 Kg) g/10 min |
| Example 1 | 43.3 | 31.1 | 25.6 | 50 | 36.99 | 8.4 |
| Example 2 | 43.6 | 31.9 | 24.5 | 50 | 24.30 | 11.5 |
| Example 3 | 41.4 | 36.6 | 22.1 | 50 | 57.17 | 17.3 |
| Example 4 | 42.5 | 32.1 | 25.4 | 50 | 32.05 | 8.0 |
| Comparative Example 1 | 43.4 | 24.8 | 31.8 | 50 | 20.04 | 6.3 |
| Comparative Example 2 | 39.9 | 22.1 | 38.0 | 50 | 12.32 | 7.1 |

As can be seen in Table 5 above, it was confirmed that the thermoplastic resin compositions of Examples 1 to 4 respectively including the polyolefin-polystyrene-based multi-block copolymers of Implemented Preparation Examples 1 to 4 had excellent low-temperature impact strength and melt flow rate, and thus, had significantly excellent overall physical properties compared to the thermoplastic resin compositions of Comparative Examples 1 and 2.

The invention claimed is:

1. A thermoplastic resin composition comprising:

(1) polypropylene; and (2) a polyolefin-polystyrene-based multi-block copolymer satisfying the following conditions (a) to (c) measured from Gel Permeation Chromatography (GPC) and the following condition (d) in $^{13}C$ NMR (500 MHz, tetrachloroethane-d2, standard material TMS) spectrum:

(a) a weight average molecular weight is 50,000 to 300,000 g/mol, (b) a molecular weight distribution is 1.5 to 3.0, (c) for gel permeation chromatography measurement results, a Gaussian function modeled from a graph having log Mw as an x-axis and dw/d log Mw as a y-axis is represented by Equation 1 below, wherein in Equation 1 below, each constant value satisfies $-0.05<A<0.06$, $4.6<B<5.5$, $0.9<C<1.1$, and $0.5<D<0.9$, and (d) a polyolefin block included in the polyolefin-polystyrene-based multi-block copolymer includes one or more branching points, wherein a carbon atom of the branching points exhibits a peak of 36 to 40 ppm, and a terminal carbon atom of a branched chain branched from the branching point exhibits a peak of 13 to 15 ppm, $$\frac{dw}{d\log Mw} = A + \frac{C\exp\left(\frac{-4\ln(2)(\log Mw - B)^2}{D^2}\right)}{D\sqrt{\frac{\pi}{4\ln(2)}}} \quad \text{[Equation 1]}$$

wherein in Equation 1 above, Mw represents the weight average molecular weight of a polyolefin-polystyrene-based multi-block copolymer.

2. The thermoplastic resin composition of claim 1, wherein each constant value of Equation 1 above satisfies $-0.04<A<0.040$, $4.6<B<5.2$, $0.91<C<1.09$, and $0.6<D<0.9$.

3. The thermoplastic resin composition of claim 1, wherein the weight average molecular weight is 60,000 g/mol to 250,000 g/mol.

4. The thermoplastic resin composition of claim 1, wherein the molecular weight distribution is 1.6 to 2.3.

5. The thermoplastic resin composition of claim 1, wherein the polyolefin-polystyrene-based multi-block copolymer is one or more selected from the group consisting of a polystyrene-poly(ethylene-co-propylene)-polystyrene block copolymer, a polystyrene-poly(ethylene-co-1-butene)-polystyrene block copolymer, a polystyrene-poly(ethylene-co-1-pentene)-polystyrene block copolymer, a polystyrene-poly(ethylene-co-1-hexene)-polystyrene block copolymer, a polystyrene-poly(ethylene-co-1-heptene)-polystyrene block copolymer, and a polystyrene-poly(ethylene-co-1-octene)-polystyrene block copolymer.

6. The thermoplastic resin composition of claim 1, wherein the polyolefin-polystyrene-based multi-block copolymer comprises a polystyrene-based block in an amount of 10 wt % to 30 wt %.

7. The thermoplastic resin composition of claim 1, wherein the polyolefin-polystyrene-based multi-block copolymer is prepared without a hydrogenation reaction for a double bond in a copolymer main chain.

8. The thermoplastic resin composition of claim 1, wherein the (1) polypropylene and the (2) polyolefin-polystyrene-based multi-block copolymer have a weight ratio of 10:90 to 90:10.

9. The thermoplastic resin composition of claim 1, wherein the thermoplastic resin composition is a thermoplastic resin composition satisfying the physical properties of the following (A) to (C):

(A) a room temperature impact strength is 3 to 100 kgf·m/m (B) a low-temperature (−40° C.) impact strength is 2 to 120 kgf·m/m, and (C) a melt flow rate (MFR, 230° C. and 2.16 kg) is 0.5 to 200 g/10 min.

10. The thermoplastic resin composition of claim 1, wherein in the polyolefin-polystyrene-based multi-block copolymer, a polystyrene chain is attached to polyolefin chains.

11. The thermoplastic resin composition of claim 1, wherein the polypropylene is a polypropylene homopolymer, or a copolymer of propylene and an alpha-olefin monomer.

12. A method for preparing a polyolefin-polystyrene-based multi-block copolymer, comprising:

(S1) forming a polyolefin block by polymerizing an olefin-based monomer using an organozinc compound as a chain transfer agent in the presence of a catalyst composition including a transition metal compound represented by Formula 1, and (S2) forming a polystyrene block by anionic polymerization of the polyolefin block and a styrene-based monomer in the presence of an alkyl lithium compound including silicon atom and a triamine compound,

[Formula 1]

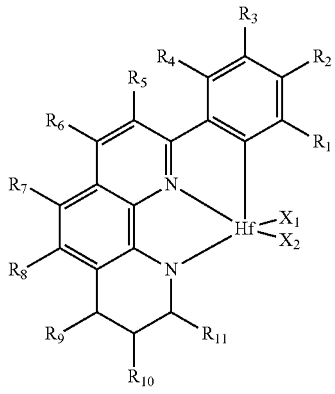

in Formula 1, $R_1$ to $R_{11}$ are each independently hydrogen, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an arylalkoxy group having 7 to 20 carbon atoms, an alkoxy group having 1 to 20 carbon atoms, an alkylaryl group having 7 to 20 carbon atoms, an alkylsilyl group having 1 to 20 carbon atoms, or an arylalkyl group having 7 to 20 carbon atoms, two or more of $R_1$ to $R_{11}$ which are adjacent to each other are optionally connected to each other to form an aliphatic ring having 3 to 20 carbon atoms or an aromatic ring having 6 to 20 carbon atoms, and $X_1$ and $X_2$ are each independently hydrogen, halogen, a hydroxyl group, an amino group, a thio group, a silyl group, a cyano group, a nitro group, an alkyl group having 1 to 20 carbon atoms, an alkenyl group having 2 to 20 carbon atoms, an alkynyl group having 2 to 20 carbon atoms, a cycloalkyl group having 3 to 20 carbon atoms, an aryl group having 6 to 20 carbon atoms, an alkylaryl group having 7 to 20 carbon atoms, an arylalkyl group having 7 to 20 carbon atoms, a heteroaryl group having 5 to 20 carbon atoms, an alkoxy group having 1 to 20 carbon atoms, an aryloxy group having 6 to 20 carbon atoms, an alkylamino group having 1 to 20 carbon atoms, an arylamino group having 6 to 20 carbon atoms, an alkylthio group having 1 to 20 carbon atoms, an arylthio group having 6 to 20 carbon atoms, an alkylsilyl group having 1 to 20 carbon atoms, or an arylsilyl group having 6 to 20 carbon atoms, wherein the organozinc compound is a compound represented by Formula 4:

[Formula 4]

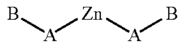

in Formula 4,

A is alkylene having 1 to 20 carbon atoms, arylene having 6 to 20 carbon atoms, or arylene having 6 to 20 carbon atoms substituted with halogen, alkyl having 1 to 12 carbon atoms, cycloalkyl having 3 to 12 carbon atoms, alkoxy having 1 to 8 carbon atoms, or aryl having 6 to 12 carbon atoms, and B is arylene having 6 to 12 carbon atoms substituted with alkenyl having 2 to 12 carbon atoms.

13. The method of claim 12, wherein the hafnium compound is represented by any one among Formula 1-1 to Formula 1-5:

[Formula 1-1]

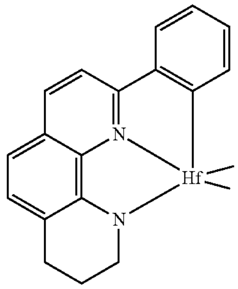

[Formula 1-2]

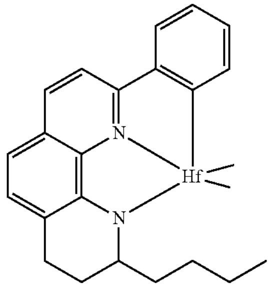

-continued

[Formula 1-3]

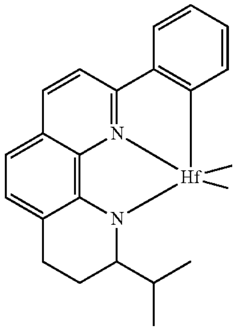

[Formula 1-4]

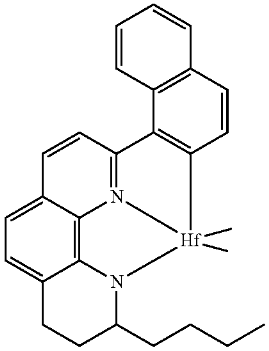

-continued

[Formula 1-5]

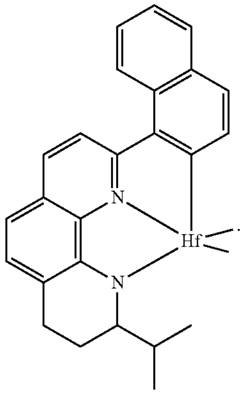

14. The method of claim 12, wherein the olefin monomer used in Step (S1) is ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicosene, or a mixture thereof.

15. The method of claim 12, wherein the styrene-based monomer used in Step (S2) comprises ethylene substituted with an aryl group having 6 to 20 carbon atoms.

* * * * *